United States Patent
Faulkinbury et al.

(10) Patent No.: US 10,233,105 B2
(45) Date of Patent: Mar. 19, 2019

(54) SUBMERGED COMBUSTION MELTERS AND METHODS OF FEEDING PARTICULATE MATERIAL INTO SUCH MELTERS

(71) Applicant: JOHNS MANVILLE, Denver, CO (US)

(72) Inventors: Albert Patrick Faulkinbury, Highlands Ranch, CO (US); Aaron Morgan Huber, Castle Rock, CO (US)

(73) Assignee: Johns Manville, Denver, CO (US)

( * ) Notice: Subject to any disclaimer, the term of this patent is extended or adjusted under 35 U.S.C. 154(b) by 130 days.

(21) Appl. No.: 15/293,463

(22) Filed: Oct. 14, 2016

(65) Prior Publication Data
US 2018/0105446 A1    Apr. 19, 2018

(51) Int. Cl.
| | |
|---|---|
| *C03B 5/235* | (2006.01) |
| *C03B 5/04* | (2006.01) |
| *C03B 3/00* | (2006.01) |

(52) U.S. Cl.
CPC .............. *C03B 5/2356* (2013.01); *C03B 3/00* (2013.01); *C03B 5/04* (2013.01); *C03B 2211/23* (2013.01)

(58) Field of Classification Search
CPC .. C03B 5/00; C03B 5/005; C03B 5/04; C03B 5/16; C03B 5/2356
See application file for complete search history.

(56) References Cited

U.S. PATENT DOCUMENTS

| | | | |
|---|---|---|---|
| 1,579,353 | A | 4/1926 | Good |
| 1,636,151 | A | 7/1927 | Schofield |
| 1,679,295 | A | 7/1928 | Dodge |
| 1,706,857 | A | 3/1929 | Mathe |

(Continued)

FOREIGN PATENT DOCUMENTS

| | | |
|---|---|---|
| DE | 40 00 358 C2 | 3/1993 |
| EP | 0 181 248 B1 | 10/1989 |

(Continued)

OTHER PUBLICATIONS

"AccuTru Temperature Measurement," AccuTru International Corporation, 2003.

(Continued)

*Primary Examiner* — Lisa L Herring
(74) *Attorney, Agent, or Firm* — Robert D. Touslee

(57) ABSTRACT

Methods of melting particulate feedstocks in a submerged combustion melter employing an arrangement of one or more submerged combustion burners emitting combustion products into turbulent molten material. Operating the burners such that there is established a turbulent melting region extending vertically from the floor to a splash region, the splash region extending vertically between the turbulent melting region and a head space region, the head space region extending vertically between the splash region and the melter ceiling, the ceiling positioned above the floor a height H2. Feeding the particulate feedstock into the splash region through one or more inlet ports, the inlet ports positioned at a height H1 measured from the floor, where H1/H2 ranges from about 0.33 to about 0.67. The SCM may have a baffle extending from the ceiling into the splash region. A particulate feedstock conduit may be employed, having an exit port in the splash region.

14 Claims, 11 Drawing Sheets

(56) References Cited

U.S. PATENT DOCUMENTS

| | | |
|---|---|---|
| 1,716,433 A | 6/1929 | Ellis |
| 1,875,474 A | 9/1932 | McKinley |
| 1,883,023 A | 10/1932 | Slick |
| 1,937,321 A | 11/1933 | Howard |
| 1,944,855 A | 1/1934 | Wadman |
| 1,989,103 A | 1/1935 | McKelvey et al. |
| 2,042,560 A | 6/1936 | Stewart |
| 2,064,546 A | 12/1936 | Kutchka |
| 2,174,533 A | 10/1939 | See et al. |
| 2,118,479 A | 1/1940 | McCaskey |
| 2,269,459 A | 1/1942 | Kleist |
| 2,432,942 A | 12/1947 | See et al. |
| 2,455,907 A | 1/1948 | Slayter |
| 2,597,858 A | 5/1952 | Howard |
| 2,658,094 A | 11/1953 | Nonken |
| 2,677,003 A | 4/1954 | Arbeit et al. |
| 2,679,749 A | 6/1954 | Poole |
| 2,691,689 A | 10/1954 | Arbeit et al. |
| 2,718,096 A | 9/1955 | Henry et al. |
| 2,773,545 A | 12/1956 | Petersen |
| 2,781,756 A | 2/1957 | Kobe |
| 2,867,972 A | 1/1959 | Holderreed et al. |
| 2,878,644 A | 3/1959 | Fenn |
| 2,690,166 A | 6/1959 | Heinze |
| 2,902,029 A | 9/1959 | Hill |
| 2,981,250 A | 4/1961 | Stewart |
| 3,020,165 A | 2/1962 | Davis |
| 3,056,283 A | 10/1962 | Tiede |
| 3,073,683 A | 1/1963 | Switzer et al. |
| 3,084,392 A | 4/1963 | Labino |
| 3,088,812 A | 5/1963 | Bitterlich et al. |
| 3,104,947 A | 9/1963 | Switzer et al. |
| 3,129,087 A | 4/1964 | Hagy |
| 3,160,578 A | 12/1964 | Saxton et al. |
| 3,165,452 A | 1/1965 | Williams |
| 3,170,781 A | 2/1965 | Keefer |
| 3,174,820 A | 3/1965 | See et al. |
| 3,215,189 A | 11/1965 | Bauer |
| 3,224,855 A | 12/1965 | Plumat |
| 3,226,220 A | 12/1965 | Plumat |
| 3,237,929 A | 3/1966 | Piumat et al. |
| 3,239,325 A | 3/1966 | Roberson et al. |
| 3,241,548 A | 3/1966 | See et al. |
| 3,245,769 A | 4/1966 | Eck et al. |
| 3,248,205 A | 4/1966 | Dolf et al. |
| 3,248,206 A | 4/1966 | Apple et al. |
| 3,260,587 A | 7/1966 | Dolf et al. |
| 3,268,313 A | 8/1966 | Burgman et al. |
| 3,285,834 A | 11/1966 | Guerrieri et al. |
| 3,294,512 A | 12/1966 | Penberthy |
| 3,325,298 A | 6/1967 | Brown |
| 3,375,095 A | 3/1968 | Poole |
| 3,380,463 A | 4/1968 | Trethewey |
| 3,385,686 A | 5/1968 | Plumat et al. |
| 3,402,025 A | 9/1968 | Garrett et al. |
| 3,407,805 A | 10/1968 | Bougard |
| 3,407,862 A | 10/1968 | Mustian, Jr. |
| 3,420,510 A | 1/1969 | Griem |
| 3,421,873 A | 1/1969 | Burgman et al. |
| 3,421,876 A | 1/1969 | Schmidt |
| 3,432,399 A | 3/1969 | Schutt |
| 3,442,633 A | 5/1969 | Perry |
| 3,445,214 A | 5/1969 | Oremesher |
| 3,498,779 A | 3/1970 | Hathaway |
| 3,499,743 A | 3/1970 | Fanica et al. |
| 3,510,393 A | 5/1970 | Burgman et al. |
| 3,519,412 A | 7/1970 | Link |
| 3,525,674 A | 8/1970 | Barnebey |
| 3,533,770 A | 10/1970 | Adler et al. |
| 3,547,611 A | 12/1970 | Williams |
| 3,563,683 A | 2/1971 | Hess |
| 3,573,016 A | 3/1971 | Rees |
| 3,592,151 A | 7/1971 | Webber |
| 3,592,623 A | 7/1971 | Shepherd |
| 3,600,149 A | 8/1971 | Chen et al. |
| 3,606,825 A | 9/1971 | Johnson |
| 3,617,234 A | 11/1971 | Hawkins et al. |
| 3,627,504 A | 12/1971 | Johnson et al. |
| 3,632,335 A | 1/1972 | Worner |
| 3,649,235 A | 3/1972 | Harris |
| 3,692,017 A | 9/1972 | Glachant et al. |
| 3,717,139 A | 2/1973 | Guillet et al. |
| 3,738,792 A | 6/1973 | Feng |
| 3,741,656 A | 6/1973 | Shapiro |
| 3,741,742 A | 6/1973 | Jennings |
| 3,746,527 A | 7/1973 | Knavish et al. |
| 3,747,588 A | 7/1973 | Malmin |
| 3,754,879 A | 8/1973 | Phaneuf |
| 3,756,800 A | 9/1973 | Phaneuf |
| 3,763,915 A | 10/1973 | Perry et al. |
| 3,764,287 A | 10/1973 | Brocious |
| 3,771,988 A | 11/1973 | Starr |
| 3,788,832 A | 1/1974 | Nesbitt |
| 3,818,893 A | 6/1974 | Kataoka et al. |
| 3,835,909 A | 9/1974 | Douglas et al. |
| 3,840,002 A | 10/1974 | Douglas et al. |
| 3,856,496 A | 12/1974 | Nesbitt et al. |
| 3,885,945 A | 5/1975 | Rees et al. |
| 3,907,565 A | 9/1975 | Francel et al. |
| 3,913,560 A | 10/1975 | Lazarre et al. |
| 3,929,445 A | 12/1975 | Zippe |
| 3,936,290 A | 2/1976 | Cerutti et al. |
| 3,951,635 A | 4/1976 | Rough |
| 3,976,464 A | 8/1976 | Wardlaw |
| 4,001,001 A | 1/1977 | Knavish et al. |
| 4,004,903 A | 1/1977 | Daman et al. |
| 4,028,083 A | 6/1977 | Patznick et al. |
| 4,083,711 A | 4/1978 | Jensen |
| 4,101,304 A | 7/1978 | Marchand |
| 4,110,098 A | 8/1978 | Mattmuller |
| 4,153,438 A | 5/1979 | Stream |
| 4,185,982 A | 1/1980 | Schwenninger |
| 4,203,761 A | 5/1980 | Rose |
| 4,205,966 A | 6/1980 | Horikawa |
| 4,208,201 A | 6/1980 | Rueck |
| 4,226,564 A | 10/1980 | Takahashi et al. |
| 4,238,226 A | 12/1980 | Sanzenbacher et al. |
| 4,249,927 A | 2/1981 | Fakuzaki et al. |
| 4,270,740 A | 6/1981 | Sanzenbacher et al. |
| 4,282,023 A | 8/1981 | Hammel et al. |
| 4,303,435 A | 12/1981 | Sleighter |
| 4,309,204 A | 1/1982 | Brooks |
| 4,316,734 A | 2/1982 | Spinosa et al. |
| 4,323,718 A | 4/1982 | Buhring et al. |
| 4,349,376 A | 9/1982 | Dunn et al. |
| 4,360,373 A | 11/1982 | Pecoraro |
| 4,397,692 A | 8/1983 | Ramge et al. |
| 4,398,925 A | 8/1983 | Trinh et al. |
| 4,405,351 A | 9/1983 | Sheinkop |
| 4,406,683 A | 9/1983 | Demarest |
| 4,413,882 A | 11/1983 | Bailey et al. |
| 4,424,071 A | 1/1984 | Steitz et al. |
| 4,432,780 A | 2/1984 | Propster et al. |
| 4,455,762 A | 6/1984 | Saeman |
| 4,461,576 A | 7/1984 | King |
| 4,488,537 A | 12/1984 | Laurent |
| 4,508,970 A | 4/1985 | Ackerman |
| 4,539,034 A | 9/1985 | Hanneken |
| 4,542,106 A | 9/1985 | Sproull |
| 4,545,800 A | 10/1985 | Won et al. |
| 4,549,896 A | 10/1985 | Streicher et al. |
| 4,599,100 A | 7/1986 | Demarest |
| 4,622,007 A | 11/1986 | Gitman |
| 4,626,199 A | 12/1986 | Bounini |
| 4,632,687 A | 12/1986 | Kunkle et al. |
| 4,634,461 A | 1/1987 | Demarest, Jr. et al. |
| 4,657,586 A | 4/1987 | Masterson et al. |
| 4,718,931 A | 1/1988 | Boettner |
| 4,723,708 A | 2/1988 | Berger et al. |
| 4,735,642 A | 4/1988 | Jensen et al. |
| 4,738,938 A | 4/1988 | Kunkle et al. |
| 4,758,259 A | 7/1988 | Jensen |
| 4,780,122 A | 10/1988 | Schwenninger et al. |
| 4,794,860 A | 1/1989 | Welton |

(56) References Cited

U.S. PATENT DOCUMENTS

| | | |
|---|---|---|
| 4,798,616 A | 1/1989 | Knavish et al. |
| 4,812,372 A | 3/1989 | Kithany |
| 4,814,387 A | 3/1989 | Donat |
| 4,816,056 A | 3/1989 | Tsai et al. |
| 4,818,265 A | 4/1989 | Krumwiede et al. |
| 4,877,436 A | 10/1989 | Sheinkop |
| 4,877,449 A | 10/1989 | Khinkis |
| 4,878,829 A | 11/1989 | Anderson |
| 4,882,736 A | 11/1989 | Pieper |
| 4,886,539 A | 12/1989 | Gerutti et al. |
| 4,900,337 A | 2/1990 | Zortea et al. |
| 4,919,700 A | 4/1990 | Pecoraro et al. |
| 4,927,866 A | 5/1990 | Backderf et al. |
| 4,932,035 A | 6/1990 | Pieper |
| 4,953,376 A | 9/1990 | Merlone |
| 4,963,731 A | 10/1990 | King |
| 4,969,942 A | 11/1990 | Schwenninger et al. |
| 4,973,346 A | 11/1990 | Kobayashi et al. |
| 5,011,086 A | 4/1991 | Sonnleitner |
| 5,032,230 A | 7/1991 | Shepherd |
| 5,052,874 A | 10/1991 | Johanson |
| 5,062,789 A | 11/1991 | Gitman |
| 5,097,802 A | 3/1992 | Clawson |
| 5,168,109 A | 12/1992 | Backderf et al. |
| 5,169,424 A | 12/1992 | Grinnen et al. |
| 5,194,747 A | 3/1993 | Culpepper et al. |
| 5,199,866 A | 4/1993 | Joshi et al. |
| 5,204,082 A | 4/1993 | Schendel |
| 5,299,929 A | 4/1994 | Yap |
| 5,360,171 A | 11/1994 | Yap |
| 5,374,595 A | 12/1994 | Dumbaugh et al. |
| 5,405,082 A | 4/1995 | Brown et al. |
| 5,412,882 A | 5/1995 | Zippe et al. |
| 5,449,286 A | 9/1995 | Snyder et al. |
| 5,473,885 A | 12/1995 | Hunter, Jr. et al. |
| 5,483,548 A | 1/1996 | Coble |
| 5,490,775 A | 2/1996 | Joshi et al. |
| 5,522,721 A | 6/1996 | Drogue et al. |
| 5,545,031 A | 8/1996 | Joshi et al. |
| 5,575,637 A | 11/1996 | Slavejkov et al. |
| 5,586,999 A | 12/1996 | Kobayashi |
| 5,595,703 A | 1/1997 | Swaelens et al. |
| 5,606,965 A | 3/1997 | Panz et al. |
| 5,613,994 A | 3/1997 | Muniz et al. |
| 5,615,668 A | 4/1997 | Panz et al. |
| 5,636,623 A | 6/1997 | Panz et al. |
| 5,672,827 A | 9/1997 | Jursich |
| 5,713,668 A | 2/1998 | Lunghofer et al. |
| 5,718,741 A | 2/1998 | Hull et al. |
| 5,724,901 A | 3/1998 | Guy et al. |
| 5,736,476 A | 4/1998 | Warzke et al. |
| 5,743,723 A | 4/1998 | Iatrides et al. |
| 5,765,964 A | 6/1998 | Calcote et al. |
| 5,814,121 A | 9/1998 | Travis |
| 5,829,962 A | 11/1998 | Drasek et al. |
| 5,833,447 A | 11/1998 | Bodelin et al. |
| 5,849,058 A | 12/1998 | Takeshita et al. |
| 5,863,195 A | 1/1999 | Feldermann |
| 5,887,978 A | 3/1999 | Lunghofer et al. |
| 5,944,507 A | 8/1999 | Feldermann |
| 5,944,864 A | 8/1999 | Hull et al. |
| 5,954,498 A | 9/1999 | Joshi et al. |
| 5,975,886 A | 11/1999 | Phillippe |
| 5,979,191 A | 11/1999 | Jian |
| 5,984,667 A | 11/1999 | Phillippe et al. |
| 5,993,203 A | 11/1999 | Koppang |
| 6,029,910 A | 2/2000 | Joshi et al. |
| 6,036,480 A | 3/2000 | Hughes et al. |
| 6,039,787 A | 3/2000 | Edlinger |
| 6,044,667 A | 4/2000 | Chenoweth |
| 6,045,353 A | 4/2000 | VonDrasek et al. |
| 6,068,468 A | 5/2000 | Phillipe et al. |
| 6,071,116 A | 6/2000 | Phillipe et al. |
| 6,074,197 A | 6/2000 | Phillippe |
| 6,077,072 A | 6/2000 | Marin et al. |
| 6,085,551 A | 7/2000 | Pieper et al. |
| 6,109,062 A | 8/2000 | Richards |
| 6,113,389 A | 9/2000 | Joshi et al. |
| 6,116,896 A | 9/2000 | Joshi et al. |
| 6,120,889 A | 9/2000 | Turner et al. |
| 6,123,542 A | 9/2000 | Joshi et al. |
| 6,126,438 A | 10/2000 | Joshi et al. |
| 6,154,481 A | 11/2000 | Sorg et al. |
| 6,156,285 A | 12/2000 | Adams et al. |
| 6,171,100 B1 | 1/2001 | Joshi et al. |
| 6,178,777 B1 | 1/2001 | Chenoweth |
| 6,183,848 B1 | 2/2001 | Turner et al. |
| 6,210,151 B1 | 4/2001 | Joshi et al. |
| 6,210,703 B1 | 4/2001 | Novich |
| 6,237,369 B1 | 5/2001 | LeBlanc et al. |
| 6,241,514 B1 | 6/2001 | Joshi et al. |
| 6,244,197 B1 | 6/2001 | Coble |
| 6,244,857 B1 | 6/2001 | VonDrasek et al. |
| 6,247,315 B1 | 6/2001 | Marin et al. |
| 6,250,136 B1 | 6/2001 | Igreja |
| 6,250,916 B1 | 6/2001 | Phillipe et al. |
| 6,274,164 B1 | 8/2001 | Novick |
| 6,276,924 B1 | 8/2001 | Joshi et al. |
| 6,276,928 B1 | 8/2001 | Joshi et al. |
| 6,293,277 B1 | 9/2001 | Panz et al. |
| 6,314,760 B1 | 11/2001 | Chenoweth |
| 6,314,896 B1 | 11/2001 | Marin et al. |
| 6,318,126 B1 | 11/2001 | Takei et al. |
| 6,332,339 B1 | 12/2001 | Kawaguchi et al. |
| 6,338,337 B1 | 1/2002 | Panz et al. |
| 6,339,610 B1 | 1/2002 | Hoyer et al. |
| 6,344,747 B1 | 2/2002 | Lunghofer et al. |
| 6,357,264 B1 | 3/2002 | Richards |
| 6,386,271 B1 | 5/2002 | Kawamoto et al. |
| 6,398,547 B1 | 6/2002 | Joshi et al. |
| 6,404,799 B1 | 6/2002 | Mori et al. |
| 6,418,755 B2 | 7/2002 | Chenoweth |
| 6,422,041 B1 | 7/2002 | Simpson et al. |
| 6,454,562 B1 | 9/2002 | Joshi et al. |
| 6,460,376 B1 | 10/2002 | Jeanvoine et al. |
| 6,470,710 B1 | 10/2002 | Takei et al. |
| 6,536,238 B2 | 3/2003 | Kawaguchi et al. |
| 6,536,651 B2 | 3/2003 | Ezumi et al. |
| 6,558,606 B1 | 5/2003 | Kulkarni et al. |
| 6,578,779 B2 | 6/2003 | Dion |
| 6,660,106 B1 | 12/2003 | Babel et al. |
| 6,694,791 B1 | 2/2004 | Johnson et al. |
| 6,701,617 B2 | 3/2004 | Li et al. |
| 6,701,751 B2 | 3/2004 | Arechaga et al. |
| 6,705,118 B2 | 3/2004 | Simpson et al. |
| 6,708,527 B1 | 3/2004 | Ibarlucea et al. |
| 6,711,942 B2 | 3/2004 | Getman et al. |
| 6,715,319 B2 | 4/2004 | Barrow et al. |
| 6,722,161 B2 | 4/2004 | LeBlanc |
| 6,736,129 B1 | 5/2004 | Sjith |
| 6,739,152 B2 | 5/2004 | Jeanvoine et al. |
| 6,796,147 B2 | 9/2004 | Borysowicz et al. |
| 6,797,351 B2 | 9/2004 | Kukarni et al. |
| 6,854,290 B2 | 2/2005 | Hayes et al. |
| 6,857,999 B2 | 2/2005 | Jeanvoine |
| 6,883,349 B1 | 4/2005 | Jeanvoine |
| 6,918,256 B2 | 7/2005 | Gutmark et al. |
| 7,027,467 B2 | 4/2006 | Baev et al. |
| 7,116,888 B1 | 10/2006 | Aitken et al. |
| 7,134,300 B2 | 11/2006 | Hayes et al. |
| 7,168,395 B2 | 1/2007 | Engdahl |
| 7,175,423 B1 | 2/2007 | Pisano et al. |
| 7,231,788 B2 | 6/2007 | Karetta et al. |
| 7,273,583 B2 | 9/2007 | Rue et al. |
| 7,330,634 B2 | 2/2008 | Aitken et al. |
| 7,383,698 B2 | 6/2008 | Ichinose et al. |
| 7,392,668 B2 | 7/2008 | Adams et al. |
| 7,428,827 B2 | 9/2008 | Maugendre et al. |
| 7,441,686 B2 | 10/2008 | Odajima et al. |
| 7,448,231 B2 | 11/2008 | Jeanvoine et al. |
| 7,454,925 B2 | 11/2008 | DeAngelis et al. |
| 7,509,819 B2 | 3/2009 | Baker et al. |
| 7,565,819 B2 | 7/2009 | Jeanvoine et al. |
| 7,578,988 B2 | 8/2009 | Jacques et al. |

(56) References Cited

U.S. PATENT DOCUMENTS

| | | |
|---|---|---|
| 7,581,948 B2 | 9/2009 | Borders et al. |
| 7,622,677 B2 | 11/2009 | Barberree et al. |
| 7,624,595 B2 | 12/2009 | Jeanvoine et al. |
| 7,748,592 B2 | 7/2010 | Koga et al. |
| 7,767,606 B2 | 8/2010 | McGinnis et al. |
| 7,778,290 B2 | 8/2010 | Sacks et al. |
| 7,781,562 B2 | 8/2010 | Crawford et al. |
| 7,802,452 B2 | 9/2010 | Borders et al. |
| 7,832,365 B2 | 11/2010 | Hannum et al. |
| 7,845,314 B2 | 12/2010 | Smith |
| 7,855,267 B2 | 12/2010 | Crawford et al. |
| 7,946,136 B2 | 5/2011 | Watkinson |
| 8,033,254 B2 | 10/2011 | Hannum et al. |
| 8,279,899 B2 | 10/2012 | Kitabayashi |
| 8,285,411 B2 | 10/2012 | Hull et al. |
| 8,402,787 B2 | 3/2013 | Pernode et al. |
| 8,424,342 B2 | 4/2013 | Kiefer et al. |
| 8,487,262 B2 | 7/2013 | Damm et al. |
| 8,650,914 B2 | 2/2014 | Charbonneau |
| 8,707,739 B2 | 4/2014 | Huber et al. |
| 8,707,740 B2 | 4/2014 | Huber et al. |
| 8,769,992 B2 | 7/2014 | Huber |
| 8,875,544 B2 | 11/2014 | Charbonneau |
| 8,973,400 B2 | 3/2015 | Charbonneau et al. |
| 8,973,405 B2 | 3/2015 | Charbonneau et al. |
| 8,991,215 B2 | 3/2015 | Shock et al. |
| 8,997,525 B2 | 4/2015 | Shock et al. |
| 9,021,838 B2 | 5/2015 | Charbonneau et al. |
| 9,032,760 B2 | 5/2015 | Charbonneau et al. |
| 9,096,452 B2 | 8/2015 | Charbonneau et al. |
| 9,096,453 B2 | 8/2015 | Charbonneau |
| 2001/0039813 A1 | 11/2001 | Simpson et al. |
| 2002/0086077 A1 | 7/2002 | Noller et al. |
| 2002/0124598 A1 | 9/2002 | Borysowicz et al. |
| 2002/0134112 A1 | 9/2002 | Barrow et al. |
| 2002/0152770 A1 | 10/2002 | Becher et al. |
| 2002/0162358 A1 | 11/2002 | Jeanvoine et al. |
| 2002/0166343 A1 | 11/2002 | LeBlanc |
| 2003/0000250 A1 | 1/2003 | Arechaga et al. |
| 2003/0015000 A1 | 1/2003 | Hayes et al. |
| 2003/0029197 A1 | 2/2003 | Jeanvoine et al. |
| 2003/0037571 A1 | 2/2003 | Kobayashi et al. |
| 2004/0025569 A1 | 2/2004 | Damm et al. |
| 2004/0099009 A1 | 5/2004 | Linz et al. |
| 2004/0128098 A1 | 7/2004 | Neuhaus et al. |
| 2004/0131988 A1 | 7/2004 | Baker et al. |
| 2004/0168474 A1 | 9/2004 | Jeanvoine et al. |
| 2004/0224833 A1 | 11/2004 | Jeanvoine et al. |
| 2005/0039491 A1 | 2/2005 | Maugendre et al. |
| 2005/0061030 A1 | 3/2005 | Ichinose et al. |
| 2005/0083989 A1 | 4/2005 | Leister et al. |
| 2005/0103323 A1 | 5/2005 | Engdal |
| 2005/0236747 A1 | 10/2005 | Rue et al. |
| 2006/0000239 A1 | 1/2006 | Jeanvoine et al. |
| 2006/0101859 A1 | 5/2006 | Takagi et al. |
| 2006/0122450 A1 | 6/2006 | Kim et al. |
| 2006/0144089 A1 | 7/2006 | Eichholz et al. |
| 2006/0162387 A1 | 7/2006 | Schmitt et al. |
| 2006/0174655 A1 | 8/2006 | Kobayashi et al. |
| 2006/0177785 A1 | 8/2006 | Varagani et al. |
| 2006/0233512 A1 | 10/2006 | Aitken et al. |
| 2006/0257097 A1 | 11/2006 | Aitken et al. |
| 2006/0287482 A1 | 12/2006 | Crawford et al. |
| 2006/0293494 A1 | 12/2006 | Crawford et al. |
| 2006/0293495 A1 | 12/2006 | Crawford et al. |
| 2007/0051136 A1 | 3/2007 | Watkinson |
| 2007/0106054 A1 | 5/2007 | Crawford et al. |
| 2007/0122332 A1 | 5/2007 | Jacques et al. |
| 2007/0130994 A1 | 6/2007 | Boratav et al. |
| 2007/0137259 A1 | 6/2007 | Borders et al. |
| 2007/0212546 A1 | 9/2007 | Jeanvoine et al. |
| 2007/0220922 A1 | 9/2007 | Bauer et al. |
| 2007/0266737 A1 | 11/2007 | Rodek et al. |
| 2007/0278404 A1 | 12/2007 | Spanke et al. |
| 2008/0035078 A1 | 2/2008 | Li |
| 2008/0227615 A1 | 9/2008 | McGinnis et al. |
| 2008/0256981 A1 | 10/2008 | Jacques et al. |
| 2008/0276652 A1 | 11/2008 | Bauer et al. |
| 2008/0278404 A1 | 11/2008 | Blalock et al. |
| 2008/0293857 A1 | 11/2008 | Crawford et al. |
| 2008/0302136 A1 | 12/2008 | Bauer et al. |
| 2009/0042709 A1 | 2/2009 | Jeanvoine et al. |
| 2009/0044568 A1 | 2/2009 | Lewis |
| 2009/0120133 A1 | 5/2009 | Fraley et al. |
| 2009/0176639 A1 | 7/2009 | Jacques et al. |
| 2009/0220899 A1 | 9/2009 | Spangelo et al. |
| 2009/0235695 A1 | 9/2009 | Pierrot et al. |
| 2009/0320525 A1 | 12/2009 | Johnson |
| 2010/0064732 A1 | 3/2010 | Jeanvoine et al. |
| 2010/0087574 A1 | 4/2010 | Crawford et al. |
| 2010/0089383 A1 | 4/2010 | Cowles |
| 2010/0120979 A1 | 5/2010 | Crawford et al. |
| 2010/0139325 A1 | 6/2010 | Watkinson |
| 2010/0143601 A1 | 6/2010 | Hawtof et al. |
| 2010/0162757 A1 | 7/2010 | Brodie |
| 2010/0227971 A1 | 9/2010 | Crawford et al. |
| 2010/0236323 A1 | 9/2010 | D'Angelico et al. |
| 2010/0242543 A1 | 9/2010 | Ritter et al. |
| 2010/0300153 A1 | 12/2010 | Zhang et al. |
| 2010/0304314 A1 | 12/2010 | Rouchy et al. |
| 2010/0307196 A1 | 12/2010 | Richardson |
| 2010/0313604 A1 | 12/2010 | Watson et al. |
| 2010/0319404 A1 | 12/2010 | Borders et al. |
| 2010/0326137 A1 | 12/2010 | Rouchy et al. |
| 2011/0016922 A1 | 1/2011 | Kitamura et al. |
| 2011/0048125 A1 | 3/2011 | Jackson et al. |
| 2011/0054091 A1 | 3/2011 | Crawford et al. |
| 2011/0061642 A1 | 3/2011 | Rouchy et al. |
| 2011/0088432 A1 | 4/2011 | Purnode et al. |
| 2011/0107670 A1 | 5/2011 | Galley et al. |
| 2011/0236846 A1 | 9/2011 | Rue et al. |
| 2011/0308280 A1 | 12/2011 | Huber |
| 2012/0033792 A1 | 2/2012 | Kulik et al. |
| 2012/0077135 A1 | 3/2012 | Charbonneau |
| 2012/0104306 A1 | 5/2012 | Kamiya et al. |
| 2012/0216567 A1 | 8/2012 | Boughton et al. |
| 2012/0216568 A1 | 8/2012 | Fisher et al. |
| 2012/0216576 A1 | 8/2012 | Boughton et al. |
| 2013/0072371 A1 | 3/2013 | Jansen et al. |
| 2013/0086944 A1 | 4/2013 | Shock et al. |
| 2013/0086949 A1 | 4/2013 | Charbonneau |
| 2013/0086950 A1 | 4/2013 | Huber et al. |
| 2013/0086951 A1 | 4/2013 | Charbonneau et al. |
| 2013/0086952 A1 | 4/2013 | Charbonneau et al. |
| 2013/0123990 A1 | 5/2013 | Kulik et al. |
| 2013/0279532 A1 | 10/2013 | Ohmstede et al. |
| 2013/0283861 A1 | 10/2013 | Mobley et al. |
| 2013/0327092 A1 | 12/2013 | Charbonneau |
| 2014/0007623 A1* | 1/2014 | Charbonneau ........ C03B 37/022 65/377 |
| 2014/0090421 A1 | 4/2014 | Shock et al. |
| 2014/0090422 A1 | 4/2014 | Charbonneau et al. |
| 2014/0090423 A1 | 4/2014 | Charbonneau et al. |
| 2014/0144185 A1 | 5/2014 | Shock et al. |
| 2015/0307382 A1* | 10/2015 | Wang ..................... C03B 3/026 65/335 |
| 2016/0116214 A1 | 4/2016 | Kirschen |
| 2017/0057855 A1* | 3/2017 | Swiler ..................... C03B 5/237 |

FOREIGN PATENT DOCUMENTS

| | | |
|---|---|---|
| EP | 1 337 789 B1 | 12/2004 |
| EP | 1 990 321 A1 | 11/2008 |
| EP | 2 138 465 A2 | 12/2009 |
| EP | 1 986 966 B1 | 4/2010 |
| EP | 1 667 934 B1 | 2/2011 |
| EP | 2 397 446 A2 | 12/2011 |
| EP | 2 404 880 A1 | 1/2012 |
| EP | 2 433 911 A1 | 3/2012 |
| EP | 2 578 548 A2 | 4/2013 |
| GB | 191301772 | 1/1914 |
| GB | 191407633 | 3/1914 |
| GB | 164073 A | 5/1921 |
| GB | 250 536 A | 7/1926 |

(56) References Cited

FOREIGN PATENT DOCUMENTS

| | | |
|---|---|---|
| GB | 959 895 A | 6/1964 |
| GB | 1449439 | 9/1976 |
| GB | 1 514 317 A | 6/1978 |
| GB | 2 424 644 A | 10/2006 |
| JP | H08 290918 A | 11/1996 |
| KR | 100465272 B1 | 12/2004 |
| WO | 1998055411 A1 | 12/1998 |
| WO | 2008103291 A1 | 8/2008 |
| WO | 2009091558 A1 | 7/2009 |
| WO | 2010011701 A2 | 1/2010 |
| WO | 2010045196 A3 | 4/2010 |
| WO | 2012048790 A1 | 4/2012 |
| WO | 2012125665 A1 | 9/2012 |
| WO | 2013 162986 A1 | 10/2013 |
| WO | 2013 188082 A1 | 12/2013 |
| WO | 2013188167 A1 | 12/2013 |

OTHER PUBLICATIONS

"Glass Technologies—The Legacy of a Successful Public-Private Partnership", 2007, U.S. Department of Energy, pp. 1-32.
"Glass Melting Technology—A Technical and Economic Assessment," 2004, U.S. Department of Energy, pp. 1-292.
Muijsenberg, H, P. H., Neff, G., Muller, J., Chmelar, J., Bodi, R. and Matustikj, F. (2008) "An Advanced Control System to Increase Glass Quality and Glass Production Yields Based on GS ESLLI Technology", in a Collection of Papers Presented at the 66th Conference on Glass Problems: Ceramic Engineering and Science Proceedings, vol. 27, Issue 1 (ed W. M. Kriven), John Wiley & Sons, Inc., Hoboken, NJ, USA. doi: 10.1002/9780470291306.ch3.
Rue, "Energy-Efficient Glass Melting—The Next Generation Metter", Gas Technology Institute, Project No. 20621 Final Report (2008).
Muijsenberg, E., Eisenga, M. and Buchmayer, J. (2010) "Increase of Glass Production Efficiency and Energy Efficiency with Model-Based Predictive Control", in 70th Conference on Glass Problems: Ceramic Engineering and Science Proceedings, vol. 31, Issue 1 (ed C. H. Drummond), John Wiley & Sons, Inc., Hoboken, NJ, USA. doi: 10.1002/9780470769843.ch15.
Sims, Richard, "Batch charging technologies—a review", www.glassonweb.com, Nikolaus Sorg Gmbh & Co KG (May 2011).
"Canty Process Technology" brochure, date unknown, copy received in Apr. 2012 at American Institute of Chemical Engineers, Spring Meeting, Houston, TX.

"Glass Melting", Battelle PNNL MST Handbook, U.S. Department of Energy, Pacific Northwest Laboratory, retrieved from the Internet Apr. 20, 2012.
"Roll Compaction", brochure from The Fitzpatrick Company, Elmhurst, Illinois, retrieved from the Internet Apr. 20, 2012.
"Glass Industry of the Future", United States Department of Energy, report 02-GA50113-03, pp. 1-17, Sep. 30, 2008.
Stevenson, "Foam Engineering: Fundamentals and Applications", Chapter 16, pp. 336-389, John Wiley & Sons (Mar. 13, 2012).
Clare et al., "Density and Surface Tension of Borate Containing Silicate Melts", Glass Technology—European Journal of Glass Science and Technology, Part A, pp. 59-62, vol. 44, No. 2, Apr. 1, 2003.
Seward, T.P., "Modeling of Glass Making Processes for Improved Efficiency", DE-FG07-96EE41262, Final Report, Mar. 31, 2003.
Conradt et al, Foaming behavior on glass melts, Glastechniche Berichte 60 (1987) Nr. 6, S. 189-201 Abstract Fraunhofer ISC.
Kim et al., "Foaming in Glass Melts Produced by Sodium Sulfate Decomposition under Isothermal Conditions", Journal of the American Ceramic Society, 74(3), pp. 551-555, 1991.
Kim et al., "Foaming in Glass Melts Produced by Sodium Sulfate Decomposition under Ramp Heating Conditions", Journal of the American Ceramic Society, 75(11), pp. 2959-2963, 1992.
Kim et al., "Effect of Furnace Atmosphere on E-glass Foaming", Journal of Non-Crystalline Solids, 352(50/51), pp. 5287-5295, 2006.
Van Limpt et al., "Modelling the evaporation of boron species. Part 1. Alkali-free borosilicate glass melts", Glass Technology—European Journal of Glass Science and Technology, Part A, 52(3): pp. 77-87, 2011.
Olabin, V.M. et al, "Submerged Combustion Furnace for Glass Melts," Ceramic Engineering and Science Proceedings, Jan. 1, 1996, pp. 84-92, vol. 17—No. 2, American Ceramic Society Inc., US.
Report for Treating Hanford LAW and WTP SW Simulants: Pilot Plant Mineralizing Flowsheet Apr. 2009, Department of Energy Environmental Management Consolidated Business Center by THOR Treatment Technologies, LLC.
Rue et al, "Submerged Combustion Melting of Glass," International Journal of Applied Glass Science, Nov. 9, 2011, pp. 262-274, vol. 2, No. 4.
National Laboratory, US DOE Contract No. DE-AC09-08SR22470, Oct. 2011.

\* cited by examiner

800 ⇘

802
A method of melting particulate feedstocks in a submerged combustion melter(SCM) employing an arrangement of one or more submerged combustion(SC) burners emitting combustion products into turbulent molten material, the SCM having a length(L) and a width(W), a centerline(C), a midpoint(M), a sidewall structure having a north side(N) and a south side(S), the sidewall structure connecting a ceiling and a floor of the SCM, the ceiling positioned above the floor a height $H_2$, the method comprising 804
Operating the SC burners such that there is established a turbulent melting region extending vertically from the floor to a splash region, the splash region extending vertically between the turbulent melting region and a head space region, the head space region extending vertically between the splash region and the melter ceiling 806
Feeding the particulate feedstock into the splash region through a single feedstock inlet port in a feed end of the SCM positioned along the SCM centerline, the inlet port positioned at a height $H_1$ measured from floor, where $H_1/H_2$ ranges from about 0.33 to about 0.67

808
Melting the particulate feedstock in the SCM

FIG. 8

SUBMERGED COMBUSTION MELTERS AND METHODS OF FEEDING PARTICULATE MATERIAL INTO SUCH MELTERS

BACKGROUND INFORMATION

Technical Field

The present disclosure relates generally to the field of submerged combustion melters and apparatus, and methods of use, and more specifically to submerged combustion melters, and methods of operating same, particularly for melting glass-forming materials, mineral wool and stone wool forming materials, and other predominantly non-metallic inorganic materials.

Background Art

A submerged combustion melter (SCM) may be employed to melt glass batch and/or waste glass materials (including waste glass materials that have an organic coating) to produce molten glass, or may melt mineral wool feedstock (basalt rock, sometimes referred to as lava rock) to make mineral wool, by passing oxygen, oxygen-enriched mixtures, or air along with a liquid, gaseous and/or particulate fuel (some of which may be in one or more of the feedstock materials), directly into a molten pool of glass or other material, usually through burners submerged in a turbulent melt pool. The introduction of high flow rates of products of combustion of the oxidant and fuel into the molten material, and the expansion of the gases during submerged combustion (SC), cause rapid melting of the feedstock and much turbulence and foaming. Conventional melters operate primarily by combusting fuel and oxidant above the molten pool of melt, and are very laminar in flow characteristics compared to SCMs.

Residence time of the material being melted in the SCM is critical to achieving good quality product. Splashing of the molten vitreous mass inside the SCM is a phenomenon unique to the SCM. While aggressive mixing and turbulence are desired for reducing time to melt feedstock, this splashing (where molten material actually breaks away from the turbulent surface and travels upward and then falls back down into the vitreous mass by gravity, or strikes the ceiling or walls of the SCM and drips back down into the molten mass, or solidifies thereon) is problematic as it causes at least some of the particulate batch feed to be splashed to undesired areas within the SCM, and is thus wasteful and decreases melt quality.

In known SCMs, raw batch or other particulate material is typically fed from above the vitreous molten material in the SCM, either from feed inlets in the ceiling or the walls above the splash region, or fed by or fed by mass movers such as screws or augers through a wall with the expectation that all of the batch will penetrate into the turbulent molten mass inside the SCM, What the present inventor has discovered, however, is that the aggressive movement of the molten vitreous material causes even more violent splashing than previously recognized, causing some of the particulate materials to reach undesired areas of the SCM, such as the ceiling, reducing residence time and/or not allowing for a homogeneous melting of raw materials. Some of the batch or other particulate material may also become entrained in the exhaust gases causing additional waste. While some of this may be recycled to the feed, it is inefficient from an energy standpoint.

It would be advantageous to take advantage of the aggressive mixing and turbulence in the SCM while minimizing the disadvantages associated with splashing in order to improve the quality (mainly determined by homogeneity) and/or the quantity of the melt from an SCM.

SUMMARY

In accordance with the present disclosure, methods of maximize mixing of particulate feed materials into molten mass within a SCM, and/or minimizing entrainment of particulate feed materials in SCM exhaust are described. "Particulate feed materials" may include glass batch or other particulate matter (organic or inorganic), fed separately or in combination (mixed, semi-mixed, or agglomerated). Methods and systems wherein particulate feed materials are fed into a "splash zone" or "splash region" inside the SCM in order to improve the quality (mainly determined by homogeneity) of the melt from an SCM, and/or or reduce feedstock loss through SCM exhaust, are described that may reduce or eliminate problems with known SCM operation to produce molten glass and other non-metallic inorganic materials, such as mineral wool.

One aspect of this disclosure is a method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, the method comprising (or alternatively consisting essentially of, or alternatively consisting of):

(a) operating the SC burners such that there is established a turbulent melting region extending vertically from the floor to a splash region, the splash region extending vertically between the turbulent melting region and a head space region, the head space region extending vertically between the splash region and the melter ceiling;

(b) feeding the particulate feedstock into the splash region through one or more inlet ports, the inlet ports positioned at a height H1 measured from the floor, where H1/H2 ranges from about 0.33 to about 0.67; and (c) melting the particulate feedstock in the SCM.

Certain embodiments may comprise, or consist essentially of, or consist of the steps of the first aspect, and in addition include providing a baffle extending vertically downward from a ceiling of the SCM into the splash region and perpendicular to the SCM centerline, the baffle having a width equal to the width (W) of the SCM, the baffle positioned between the SCM feed end and the midpoint (M) of the SCM, and operating the SCM so that the splash region submerges a distal end of the baffle. Certain embodiments may comprise, or consist essentially of, or consist of the steps of the first aspect, and in addition include providing a baffle as just described, and further deploying one or more feed conduits having an inlet in the ceiling and an outlet in the splash region, feeding the portion of the particulate feedstock though the one or more feed conduits, the one or more feed conduits positioned between the SCM feed end and the SCM midpoint (M), and operating the SCM so that the splash region submerges the feed inlet conduit exit ends and a distal end of the baffle.

Another aspect of the disclosure are submerged combustion melters for carrying out such methods. Other method and SCM embodiments, such as detailed herein, are considered aspects of this disclosure. SCMs and methods of the disclosure will become more apparent upon review of the brief description of the drawings, the detailed description of the disclosure, and the claims that follow.

BRIEF DESCRIPTION OF THE DRAWINGS

The manner in which the objectives of the disclosure and other desirable characteristics can be obtained is explained in the following description and attached drawings in which:

FIGS. 7, 8, 9, and 10 are logic diagrams illustrating various methods of the present disclosure.

Figure 1:
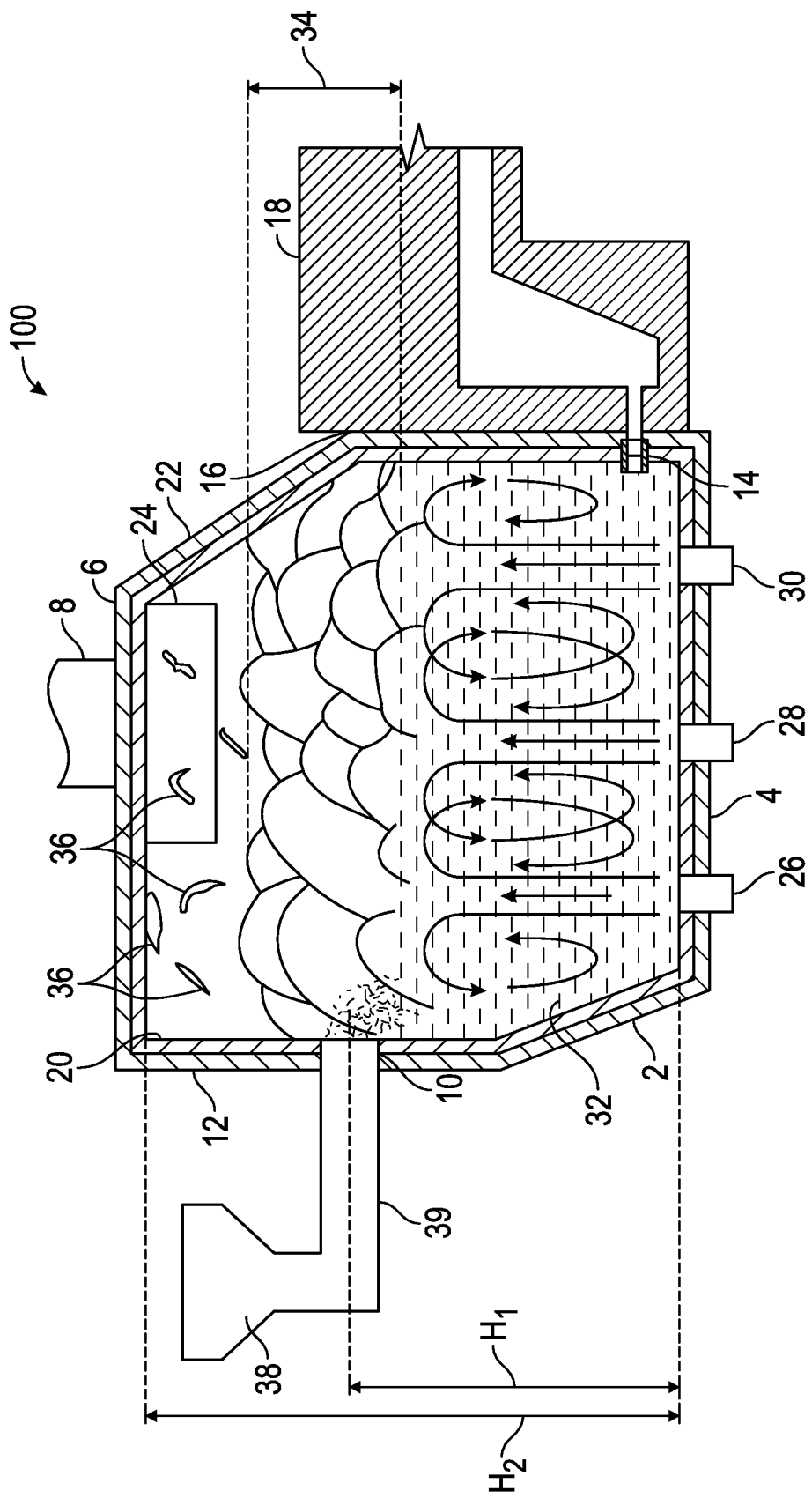
FIG. 1 is a schematic side elevation view, partially in cross-section, of a first embodiment of a submerged combustion melter (SCM) in accordance with the present disclosure.

It is to be noted, however, that the appended drawings are schematic in nature, may not be to scale, and illustrate only typical embodiments of this disclosure and are therefore not to be considered limiting of its scope, for the disclosure may admit to other equally effective embodiments.

DETAILED DESCRIPTION

In the following description, numerous details are set forth to provide an understanding of the disclosed systems, apparatus, and methods. However, it will be understood by those skilled in the art that the systems, apparatus, and methods covered by the claims may be practiced without these details and that numerous variations or modifications from the specifically described embodiments may be possible and are deemed within the claims. For example, wherever the term "comprising" is used, embodiments and/ or components where "consisting essentially of" and "consisting of" are explicitly disclosed herein and are part of this disclosure. An example of "consisting essentially" is with respect to the total feed to an SCM: a feed consisting essentially of particulate feedstock means there may be a minor portion of feed that is not particulate feedstock, such as rock used to make mineral wool. An example of "consisting of" may be a feedstock made up of only particulate feedstock, or only inorganic particulate feedstock. Another example of "consisting essentially of" may be with respect to particulate feedstock that consists essentially of inorganic feedstock, meaning that a minor portion, perhaps up to 10, or up to 9, or up to 8, or up to 7, or up to 6, or up to 5, or up to 4, or up to 3, or up to 2, or up to 1 wt. percent may be organic. Another example of "consisting essentially of" may be with respect to particulate feedstock that consists essentially of non-metallic feedstock, meaning that a minor portion, perhaps up to 10, or up to 9, or up to 8, or up to 7, or up to 6, or up to 5, or up to 4, or up to 3, or up to 2, or up to 1 wt. percent may be metallic.

All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

As explained briefly in the Background, one drawback to present operation of SCMs is that in known SCMs, raw particulate batch material or other inorganic or organic particulate material is fed from above the vitreous molten material in the SCM, either from feed inlets in the ceiling or the walls above the splash area, or fed by gravity through a wall with the expectation that all of the batch will penetrate into the turbulent molten mass inside the SCM. What the present inventor has discovered, however, is that the aggressive movement of the molten vitreous material causes even more violent splashing than previously recognized, causing some of the particulate material to reach undesired areas of the SCM, such as the ceiling, reducing residence time and/or not allowing for a homogeneous melting of raw materials. Some of the raw particulate batch material or other particulate feed material may also become entrained in the exhaust gases causing additional waste. While some of this may be recycled to the feed, it is inefficient from an energy standpoint.

The inventor herein has discovered various modifications to previously known SCMs and methods of operating same that achieve the desired goal of increased residence time of the material being melted in the SCM, which is critical to achieving good quality product. In particular, the SCMs and methods described herein take advantage of the aggressive mixing and turbulence in the SCM while minimizing the disadvantages associated with splashing in order to improve the quality (mainly determined by homogeneity) and/or the quantity of the melt from an SCM.

There are innumerable options, variations within options, and sub-variations of options for the SCM operator to select from when operating an SCM and profiling the SC burners. After all, the SCM is essentially a continuous or semi-batch chemical reactor with simultaneous heat and mass transfer. For example, to name just a few, an operator may choose (option 1) to operate all SC burners equally, that is, using the same fuel and oxidant, and of the total combustion flow rate (TCFR) from the SC burners, each SC burner is operated to produce the same fraction of the TCFR. Another option (option 2) would be to operate as option 1, but with different oxidant in one or more burners. Option 3 may be to operate with same oxidant in all burners, but with different fuel in one or more SC burners. As one can readily see, the number of options is quite large, and selecting the operation of the SC burners in such a chemical reactor with simultaneous heat and mass transfer can be an overwhelming task. Even if the "same" fuel and "same" oxidant are used for each SC burner (an ideal assumption that is never true in practice, since fuel and oxidant compositions change with time), the variations are endless, and can be an overwhelming task to sort through. The task of operating an SCM is even more daunting when particulate feed materials are fed to the SCM from above the turbulent, violent melt.

The present disclosure is devoted to resolving this challenge by "splash region feeding" of particulate materials, in other words, feeding all or a major portion of particulate materials into the splash region as described herein. The SCM is then operated so that the feed inlet ports (either in the sidewall structure of the SCM, the end of one or more feed conduits having their distal ends in the splash region, or both) are submerged in the splash region, that region of the SCM where the melt is expanding upward due to the aggressive firing of the SC burners, and "popping", causing pressure surges in the melter.

Various terms are used throughout this disclosure. The terms "process" and method" are considered interchangeable. "Submerged" as used herein when referencing the SC burners means that combustion gases emanate from combustion burners or combustion burner panels under the level of the molten glass in a turbulent molten melt region as defined herein; the burners or burner panels may be floor-mounted, wall-mounted, or in melter embodiments comprising more than one submerged combustion burner, any combination thereof (for example, two floor mounted burner panels and one wall mounted burner panel). Burner panels (such as described in Applicant's U.S. application Ser. No. 14/838.148, filed Aug. 27, 2015) may form part of an SCM floor and/or wall structure. In certain embodiments one or more burner panels described herein may form the entire floor. A "burner panel" is simply a panel equipped to emit fuel and oxidant, or in some embodiments only one of these (for example a burner panel may only emit fuel, while another burner panel emits only oxidant, and vice versa). "SC" as used herein means "submerged combustion" unless otherwise specifically noted, and "SCM" means submerged combustion melter unless otherwise specifically noted. The term "submerged" when referencing particulate feed material inlet ports or distal ends of feed conduits has similar meaning, except that they are submerged in the splash region rather than the turbulent molten melt region.

As used herein the phrase "combustion gases" as used herein means substantially gaseous mixtures comprised primarily of combustion products, such as oxides of carbon (such as carbon monoxide, carbon dioxide), oxides of nitrogen, oxides of sulfur, and water, as well as partially combusted fuel, non-combusted fuel, and any excess oxidant. Combustion products may include liquids and solids, for example soot and unburned liquid fuels. "Exhaust", "melter exhaust", and "melter flue gas" are equivalent terms and refer to a combination of combustion gases and effluent from the feedstock being melted, such as adsorbed water, water of hydration, $CO_2$ liberated from $CaCO_3$, and the like. Therefore exhaust may comprise oxygen or other oxidants, nitrogen, combustion products (including but not limited to, carbon dioxide, carbon monoxide, $NO_x$, $SO_x$, $H_2S$, and water), uncombusted fuel, reaction products of melt-forming ingredients (for example, but not limited to, basalt, sand (primarily $SiO_2$), clay, limestone (primarily $CaCO_3$), burnt dolomitic lime, borax and boric acid, and the like.

As used herein, unless indicated to the contrary, "feedstock" includes, but is not limited to: glass batch; cullet; and pieces of porous, semi-porous, or solid rock or other non-metallic or predominantly non-metallic inorganic material, or organic material, or mixture of organic and inorganic material. "Particulate feedstock" as used herein means any feedstock having a weight average particle size (APS) that is small, where small is less than 1 mm APS. Other size feedstock(s) may simultaneously be fed to the SCMs of this disclosure, for example feedstocks having particle size ranging from about 1 mm to about 10 cm, or from about 1 cm to about 10 cm, or from about 2 to about 5 cm, or from about 1 to about 2 cm. The only upper limit on feedstock weight average particle size for these larger APS feedstocks is the internal diameter of feedstock supply structure components, such as described in Applicant's U.S. Pat. No. 9,643,869, issued May 9, 2017, while the lower size limit is determined by angle of flow, flow rate of feedstock, and in those embodiments where heat is exchanged directly or indirectly from melter exhaust to the feedstock, flow rate of melter exhaust.

"Oxidant" as used herein includes air, gases having the same molar concentration of oxygen as air (for example "synthetic air"), oxygen-enriched air (air having oxygen concentration greater than 21 mole percent), and "pure" oxygen grades, such as industrial grade oxygen, food grade oxygen, and cryogenic oxygen. Oxygen-enriched air may have 50 mole percent or more oxygen, and in certain embodiments may be 90 mole percent or more oxygen.

The term "fuel", according to this disclosure, means a combustible composition comprising a major portion of, for example, methane, natural gas, liquefied natural gas, propane, hydrogen, steam-reformed natural gas, atomized hydrocarbon oil, combustible powders and other flowable solids, for example, coal powders, carbon black, soot, and the like. Fuels useful in the disclosure may comprise minor amounts of non-fuels therein, including oxidants, for purposes such as premixing the fuel with the oxidant, or atomizing liquid or particulate fuels. As used herein the term "fuel" includes gaseous fuels, liquid fuels, flowable solids, such as powdered carbon or particulate material, waste materials, slurries, and mixtures or other combinations thereof. Certain methods within the disclosure include methods wherein the fuel may be a substantially gaseous fuel selected from the group consisting of methane, natural gas, liquefied natural gas, propane, carbon monoxide, hydrogen, steam-reformed natural gas, atomized oil or mixtures thereof, and the oxidant may be an oxygen stream comprising at least 90 mole percent oxygen.

The sources of oxidant and fuel may be one or more conduits, pipelines, storage facilities, cylinders, or, in embodiments where the oxidant is air, ambient air. Oxygen-enriched oxidants may be supplied from a pipeline, cylinder, storage facility, cryogenic air separation unit, membrane permeation separator, or adsorption unit such as a vacuum swing adsorption unit.

Certain method embodiments may comprise a first method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, the method comprising (or consisting essentially of, or consisting of):

(a) operating the SC burners such that there is established a turbulent melting region extending vertically from the floor to a splash region, the splash region extending vertically between the turbulent melting region and a head space region, the head space region extending vertically between the splash region and the melter ceiling;

(b) feeding the particulate feedstock into the splash region through one or more inlet ports, the inlet ports positioned at a height H1 measured from the floor, where H1/H2 ranges from about 0.33 to about 0.67; and (c) melting the particulate feedstock in the SCM.

Certain method embodiments may comprise feeding the particulate feedstock into the splash region of the SCM through a single feedstock inlet port in a feed end of the SCM positioned along the SCM centerline.

Certain method embodiments may comprise feeding the particulate feedstock into the splash region of the SCM through a plurality of feedstock inlet ports in a feed end of the SCM positioned equidistant from the centerline.

Certain method embodiments may comprise feeding the particulate feedstock into the splash region of the SCM through a single feedstock inlet port in a feed end of the SCM positioned along the centerline and another feedstock inlet port in the north side or south side.

Certain method embodiments may comprise providing a baffle extending vertically downward from a ceiling of the SCM into the splash region and perpendicular to the SCM centerline, the baffle having a width equal to the width (W) of the SCM, the baffle positioned between the SCM feed end and the midpoint (M) of the SCM, and operating the SCM so that the splash region submerges a distal end of the baffle, and allowing exhaust to flow out of an exhaust stack of the SCM attached to a ceiling of the SCM along the SCM centerline, the exhaust stack positioned between the midpoint (M) and the exit end wall of the SCM.

Certain method embodiments may comprise
feeding at least a portion of the particulate feedstock into a splash region of the SCM comprises deploying one or more feed conduits having an inlet in the ceiling and an outlet in the splash region,
feeding the portion of the particulate feedstock though the one or more feed conduits, the one or more feed conduits positioned between the SCM feed end and the SCM midpoint (M),
providing a baffle extending vertically downward from a ceiling of the SCM into the splash region and perpendicular to the SCM centerline, the baffle having a width equal to the width (W) of the SCM, the baffle positioned between the one or ore feed conduits and the SCM midpoint (M), and
operating the SCM so that the splash region submerges the feed inlet conduit exit ends and a distal end of the baffle, and
allowing exhaust to flow out of an exhaust stack of the SCM attached to a ceiling of the SCM along the SCM centerline, the exhaust stack positioned between the midpoint (M) and the exit end wall of the SCM.

Certain method embodiments may comprise feeding small (less than 1 mm APS) particle size batch material to the SCM into the at least one feed inlet port.

Certain method embodiments may comprise feeding large particle size feedstock (at least 10 cm APS) into the SCM through one or more auxiliary inlet ports in the inlet end.

Certain method embodiments may comprise a second method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, the method comprising:
(a) operating the SC burners such that there is established a turbulent melting region extending vertically from the floor to a splash region, the splash region extending vertically between the turbulent melting region and a head space region, the head space region extending vertically between the splash region and the melter ceiling;
(b) feeding the particulate feedstock into the splash region through a single feedstock inlet port in a feed end of the SCM positioned along the SCM centerline, the inlet port positioned at a height H1 measured from the floor, where H1/H2 ranges from about 0.33 to about 0.67; and
(c) melting the particulate feedstock in the SCM.

Certain method embodiments may comprise a third method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, and an exhaust stack of the SCM attached to a ceiling of the SCM along the SCM centerline, the exhaust stack positioned between the midpoint and the exit end wall of the SCM, the method comprising:
(a) operating the SC burners such that there is established a turbulent melting region extending vertically from the floor to a splash region, the splash region extending vertically between the turbulent melting region and a head space region, the head space region extending vertically between the splash region and the melter ceiling;
(b) feeding the particulate feedstock into the splash region through a single feedstock inlet port in a feed end of the SCM positioned along the SCM centerline, the inlet port positioned at a height H1 measured from the floor, where H1/H2 ranges from about 0.33 to about 0.67; and
(c) melting the particulate feedstock in the SCM;
(d) providing a baffle extending vertically downward from a ceiling of the SCM into the splash region and perpendicular to the SCM centerline, the baffle having a width equal to the width (W) of the SCM, the baffle positioned between the SCM feed end and the midpoint of the SCM;
(e) operating the SCM so that a distal end of the baffle is submerged in the splash region.

Certain method embodiments may comprise a fourth method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, and an exhaust stack of the SCM attached to a ceiling of the SCM along the SCM centerline, the exhaust stack positioned between the midpoint and the exit end wall of the SCM, the method comprising:
(a) operating the SC burners such that there is established a turbulent melting region extending vertically from the floor to a splash region, the splash region extending vertically between the turbulent melting region and a head space region, the head space region extending vertically between the splash region and the melter ceiling;
(b) feeding the particulate feedstock into the splash region through one or more feed conduits extending from the ceiling of the SCM into the splash region, the feed conduit positioned between the SCM feed end and the SCM midpoint, the one or more feed conduits having exit ports positioned at a height H1 measured from the floor, where H1/H2 ranges from about 0.33 to about 0.67;

(c) melting the particulate feedstock in the SCM;

(d) providing a baffle extending vertically downward from a ceiling of the SCM into the splash region and perpendicular to the SCM centerline, the baffle having a width equal to the width (W) of the SCM, the baffle positioned between the SCM feed end and the midpoint of the SCM; and (e) operating the SCM so that the splash region submerges a distal end of the baffle and the exit ports of the feed conduits.

Certain method embodiments may comprise the method in accordance with the second, third, or fourth embodiments including feeding small (less than 1 mm APS) particle size batch material into the SCM through the one or more feed inlet ports.

Certain method embodiments may comprise the method in accordance with the second, third, or fourth embodiments including feeding large particle size feedstock (at least 10 cm APS) into the SCM through one or more auxiliary inlet ports in the inlet end.

Certain method embodiments may comprise wherein H1/H2 ranges from about 0.4 to about 0.6.

Certain method embodiments may comprise operating the SCM such that the turbulent melting region extends vertically from the floor to the splash region a height H4, and the splash region extends vertically a height H3, where H2>H3>H4, and where H3>H1>H4.

Certain method embodiments may comprise operating the SCM such that H3/H4 ranges from about 1.1 to about 2.

Certain SCM embodiments may comprise a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H1, the SCM comprising:

(a) one or more particulate feedstock inlet ports, the inlet ports positioned at a height H2, where H2/H1 ranges from about 0.33 to about 0.67.

Certain SCM embodiments may comprise a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H1, the SCM comprising:

(a) a single particulate feedstock inlet port in a feed end of the SCM positioned along the SCM centerline, the inlet port positioned at a height H2 measured form the SCM floor, where H2/H1 ranges from about 0.33 to about 0.67.

Certain SCM embodiments may comprise a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H1, the SCM comprising:

(a) a single particulate feedstock inlet port in a feed end of the SCM positioned along the SCM centerline, the inlet port positioned at a height H2 measured form the SCM floor, where H2/H1 ranges from about 0.33 to about 0.67; and (b) a baffle extending vertically downward from a ceiling of the SCM into the splash region and perpendicular to the SCM centerline, the baffle having a width equal to the width (W) of the SCM, the baffle positioned between the SCM feed end and the midpoint (M) of the SCM, an exhaust stack of the SCM attached to a ceiling of the SCM along the SCM centerline, the exhaust stack positioned between the midpoint and the exit end wall of the SCM.

Certain SCM embodiments may comprise a submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H1, the SCM comprising:

(a) one or more feed conduits having an inlet in the ceiling of the SCM and an exit positioned at a height H2 measured from the floor, where H2/H1 ranges from about 0.33 to about 0.67, the one or more feed conduit inlets positioned between the SCM feed end and the SCM midpoint;

(b) a baffle extending vertically downward from a ceiling of the SCM into the splash region and perpendicular to the SCM centerline, the baffle having a width equal to the width (W) of the SCM, the baffle positioned between the one or more feed conduits and the midpoint of the SCM, (c) an exhaust stack attached to a ceiling of the SCM along the SCM centerline, the exhaust stack positioned between the midpoint (M) and the exit end wall of the SCM.

Figure 2:
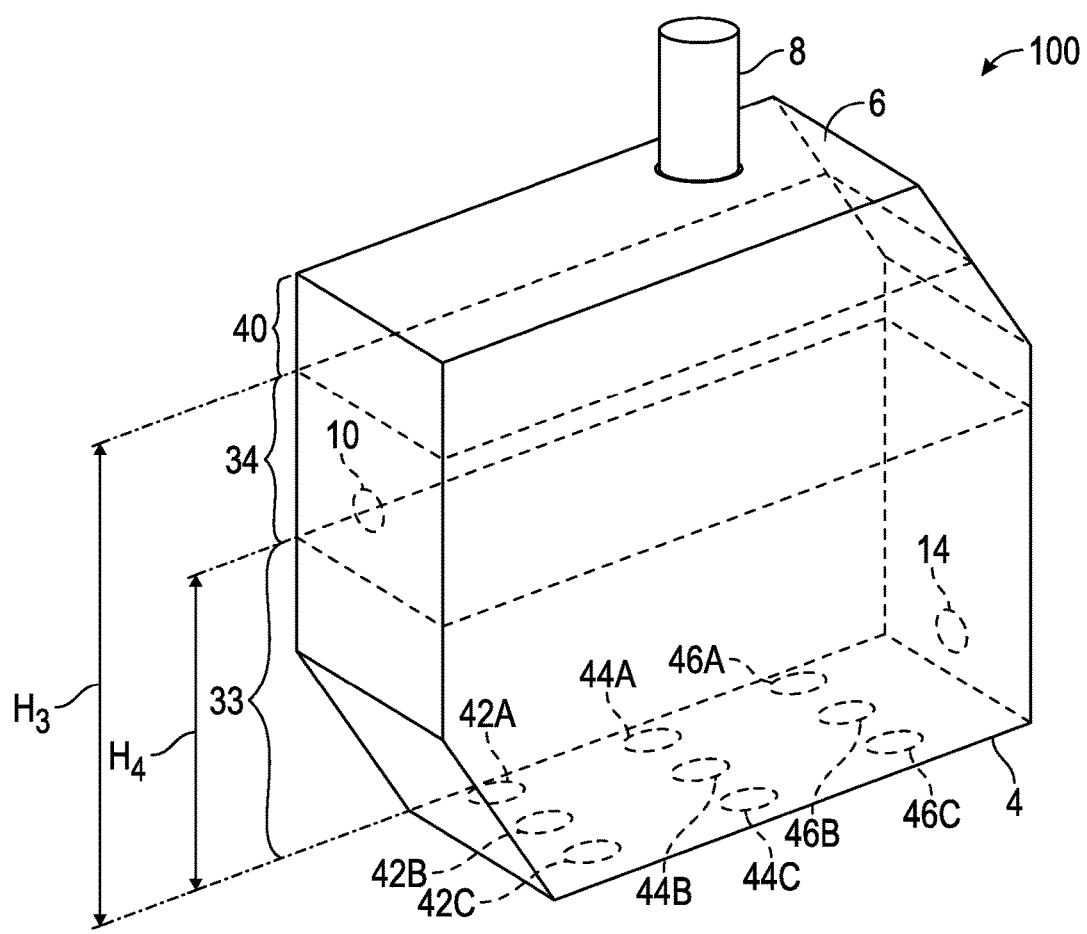
FIG. 2 is a schematic perspective view, partially in phantom, with some parts removed for clarity, of the SCM illustrated schematically in FIG. 1.

Referring now to the drawing figures, FIG. 1 is a schematic side elevation view, partially in cross-section, of a first embodiment 100 of a submerged combustion melter (SCM) in accordance with the present disclosure, and FIG. 2 is a schematic perspective view, partially in phantom, with some parts removed for clarity, of the SCM illustrated schematically in FIG. 1. Embodiment 100 includes nine SC burners are arranged in a 3×3 matrix of rows and columns, as illustrated schematically in the plan view of one melter floor plan in FIG. 11. The SCM includes a sidewall structure 2, floor 4, roof or ceiling 6, exhaust stack 8 (there may be more than one), and a particulate feedstock inlet 10 in a splash region 34. Particulate feedstock inlet 10 (there may be more than one) is fed by a particulate feeder 38, which may include an auger or screw feeder (not illustrated), as well as a device to maintain the inlet 10 open, such as a pipe-in-pipe knife arranged inside feeder tube 39 operated by an actuator with a timer for example (the knife, actuator, and timer are not illustrated for clarity). For purposes of description, the SCM has a feed end (or first end) 12 and a melt exit end (or second end) 16, the latter having a melt exit 14. While not important to the various SCM and method embodiments described herein, SCM 100 is typically fluidly connected to (but not necessarily structurally connected to) a melter exit structure 18. SCM 100 further includes a refractory lining 20 and a superstructure 22 each of which may comprise one or more fluid-cooled panels ("fluid-cooled" is a defined term herein). Also illustrated is an exhaust plenum 24, one or more exhaust gas outlets that can be from the side or top of the SCM. Also illustrated schematically in FIG. 1 are positions of SC burners 26, 28, and 30, which are the centerline SC burners, turbulent melt 32 in a turbulent melt region 33 (with curved arrows indicating approximate flow pattern for the turbulent melt), and splash region 34. The SCM also has a head space region 40 (FIG. 2) above splash region 34 where gobs or splashes of molten material 36 break free and may be in free flight, and may collide with each other or with the refractory inside the SCM, or they may simply fall back into the splash region 34 and fall further into the molten melt 32. FIG. 2 also illustrates the positions of passages 42A, 42B, 42C, 43A, 43B, 43C, 44A, 44B, and 44C through SCM floor 4 for SC burners (not illustrated in FIGS. 2, 4, and 6).

Referring again to FIGS. 1 and 2, Heights H1, H2, H3, and H4 may be defined, where H1 is defined as the height of the particulate feedstock inlet port measured from SCM floor 4; H2 is defined as the height of the SCM ceiling 6 as measured from the SCM floor 4; H3 is defined as the maximum height of the splash region 34 (or the minimum height of the head space region 40); and H4 is defined as the minimum height of the splash region 34 (or the maximum height of the turbulent melt region 33). The ratio of H1/H2 is an important parameter, and may range from about 0.33 to about 0.67. All ranges, sub-ranges, and point values from about 0.33 to about 0.67 are explicitly disclosed herein. The lower limit of the ratio H1/H2 may be 0.335, 0.34, 0.345, 0.35, 0.355, 0.36, 0.365, 0.37, 0.375, 0.38, 0.385, 0.39, 0.395, 0.4, 0.405, 0.41, 0.415, 0.42, 0.425, 0.43, 0.435, 0.44, 0.445, 0.45, 0.455, 0.46, 0.465, 0.47, 0.475, 0.48, 0.485, 0.49, 0.495, or 0.5; the upper limit of H1/H2 may be 0.5, 0.505, 0.51, 0.515, 0.52, 0.525, 0.53, 0.535, 0.54, 0.545, 0.55, 0.555, 0.56, 0.565, 0.57, 0.575, 0.58, 0.585, 0.59, 0.595, 0.6, 0.605, 0.61, 0.615, 0.62, 0.625, 0.63, 0.635, 0.64, 0.645, 0.65, 0.655, 0.66, or 0.665. For example, H1/H2 may range from about 0.4 to about 0.6; or from about 0.45 to about 0.67, or from 0.40 to 0.60, or from 0.45 to 0.67. The relative term "about" when used to describe H1/H2 means within 0.001, or within 0.01, or within 0.1. The values of ratio H3 and H4 during operation of SCMs of the present disclosure may be the same or different along the centerline (C) of the SCM, and along the width (W) of the SCM. It is preferred that the relationship H3>H1>H4 holds in all locations inside SCMs of this disclosure, but especially in the vicinity of the particulate feedstock inlet port or ports 10.

Figure 11:
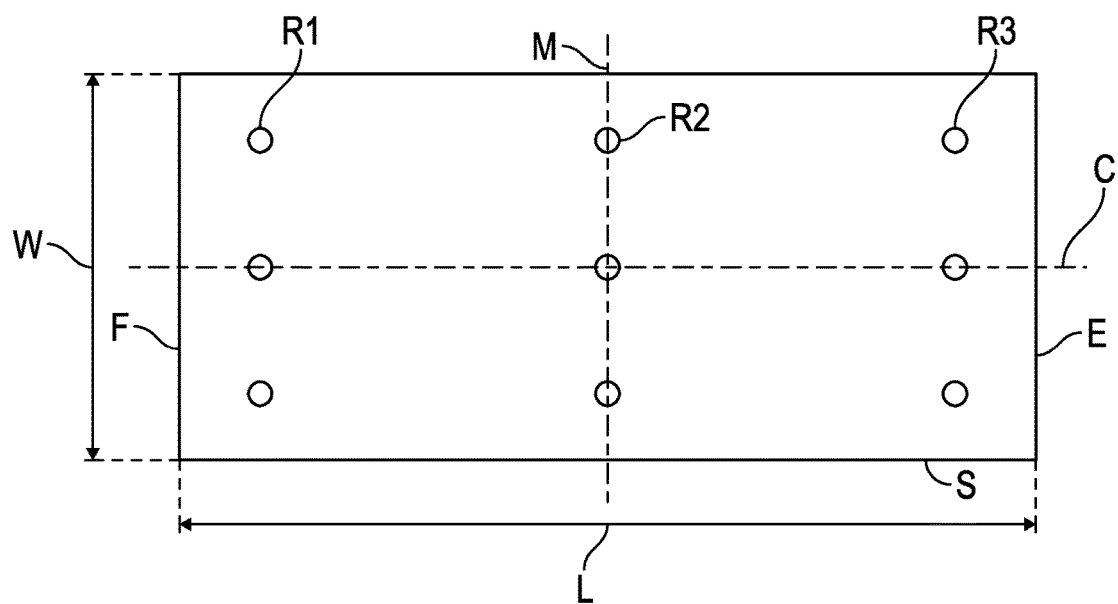
FIG. 11 is a schematic plan view of one melter floor plan in accordance with the present disclosure.

Important to certain methods of the present disclosure are the definitions exemplified schematically in FIGS. 11: R1, R2, and R3 designate the first row, second row, and third row of SC burners, where the first row R1 is closest to the feed end 12 of the SCM, and the third row R3 is closest to the melt exit end 16. There may be more or less than three rows of SC burners. Further defined in FIG. 11 are the length (L) of the SCM, the width (W), the midpoint (M), the centerline (C), and the north (N) and south (S) sides of the SCM, the SCM having a feed end (F, same as 12) and exit end (E, same as 16), where (F) and (E) are deemed more generic than designations 12 and 16 illustrated in FIG. 1.

Figure 3:
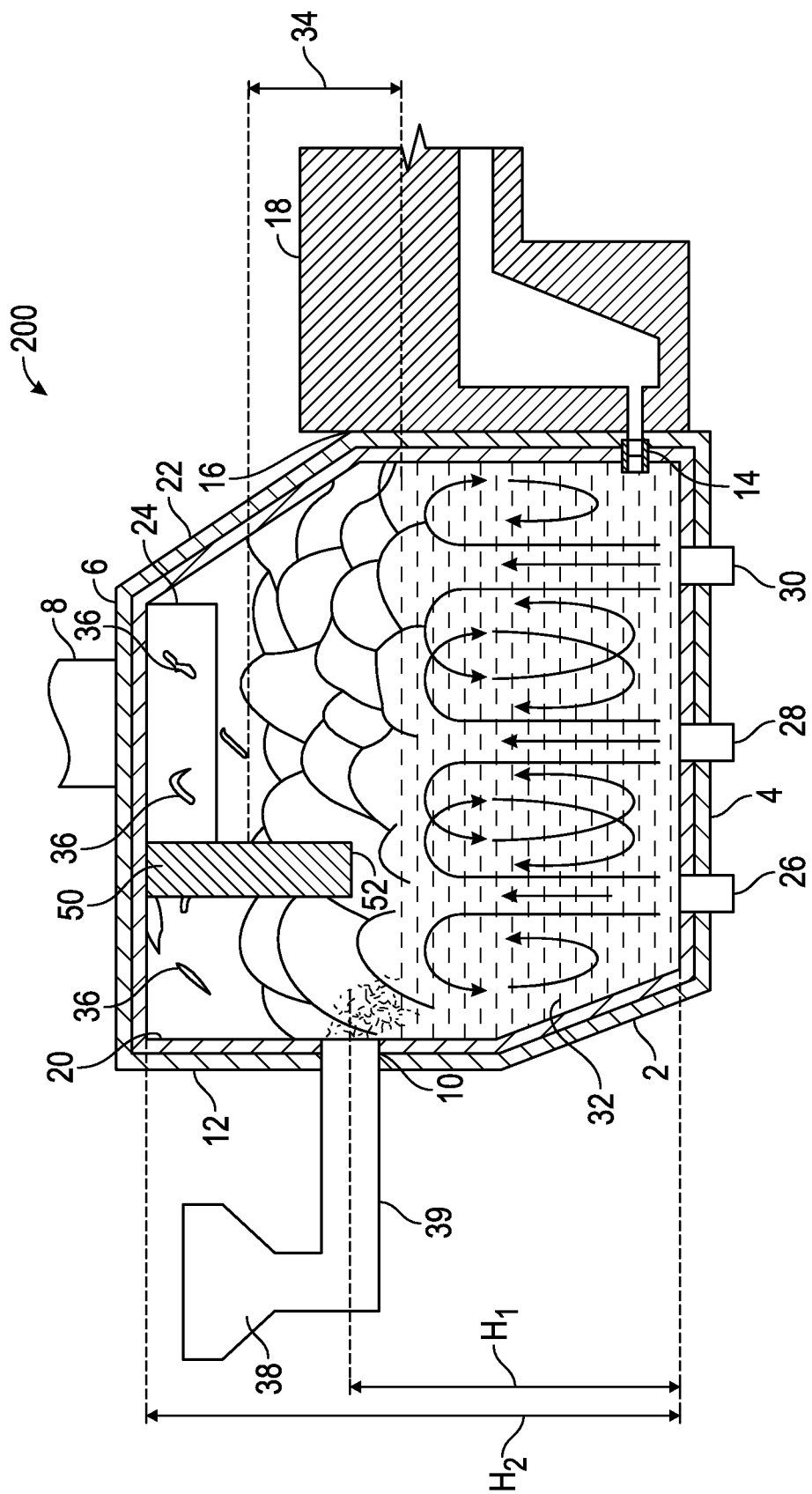
FIG. 3 is a schematic side elevation view, partially in cross-section, of a second embodiment of a SCM in accordance with the present disclosure.
Figure 4:
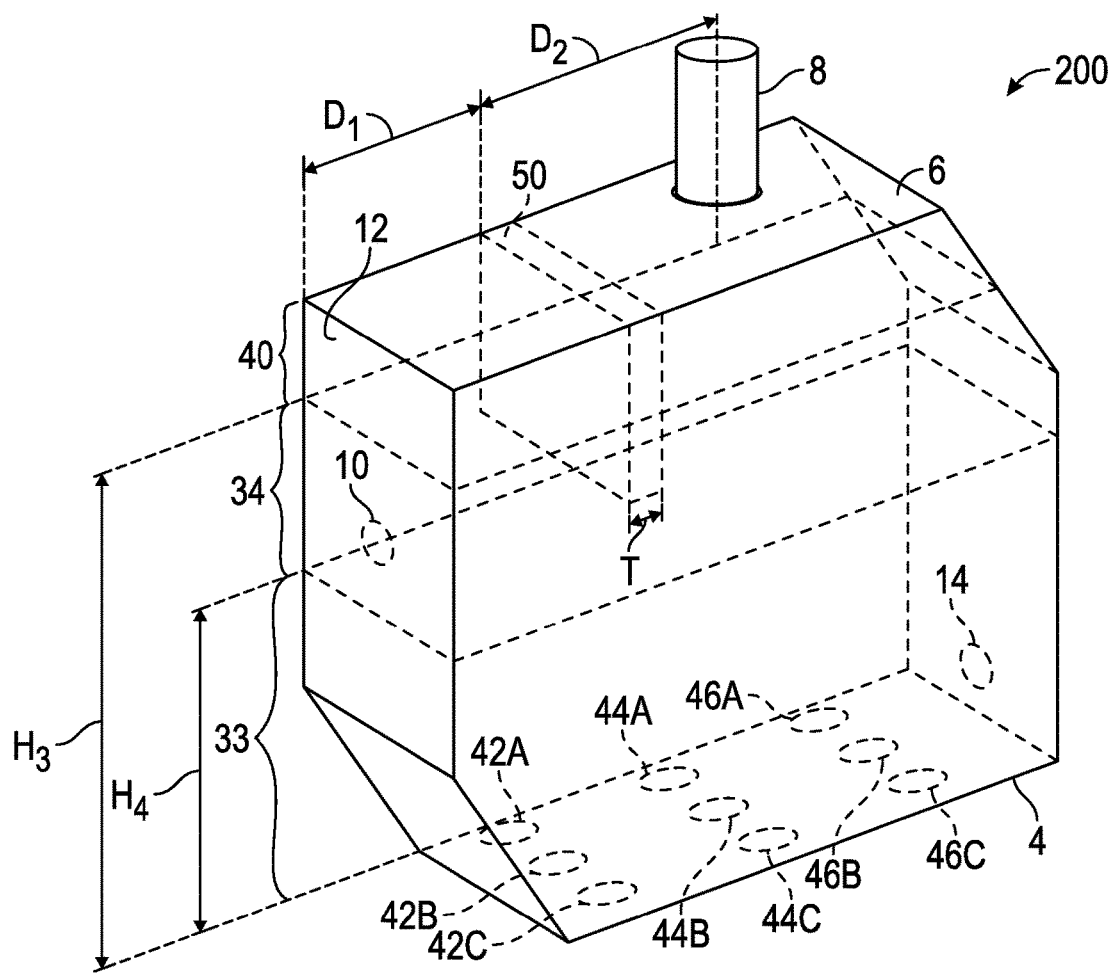
FIG. 4 is a schematic perspective view, partially in phantom, with some parts removed for clarity, of the SCM illustrated schematically in FIG. 3.

Referring now to FIGS. 3 and 4, FIG. 3 is a schematic side elevation view, partially in cross-section, of a second embodiment 200 of a SCM in accordance with the present disclosure, and FIG. 4 is a schematic perspective view, partially in phantom, with some parts removed for clarity, of the SCM illustrated schematically in FIG. 3. SCM embodiment 200 includes a baffle 50 having a distal end 52 that is submerged in splash region 34, and preferably a significant portion of baffle 50 (for example the lower quarter, third, or half) may also be submerged in splash region 34. Baffle may or may not be fluid-cooled. Baffle 50 need not be vertical as illustrated schematically in FIGS. 3 and 4, but is the most straightforward to implement. Baffle 50 in embodiment 200 has a baffle width equal to melter width (W) as illustrated in FIG. 11, and a thickness (T), which may be several inches or centimeters, for example 2, 3, 4, 5, or 6 inches thick. Baffle 50 may be positioned a distance D1 away from the feed end wall 12, and a distance D2 from stack 8, both as measured from a front side of the baffle. The distance D1 is generally less than the distance between the feed end wall 12 (or F in FIG. 11) and the SCM midpoint (M), while stack 8 is generally positioned between SCM midpoint (M) and melter exit end 16 (or E in FIG. 11). Baffle 50 may be stationary or movable vertically, for example using an actuator (not illustrated), such as a rack and pinion device, jack screw, hydraulic cylinder, or the like. During operation of SCM 200, baffle 50 advantageously works with splash region feeding to reduce or eliminate particulate feedstock entering through inlet port 10 from being entrained into melter exhaust.

Figure 5:
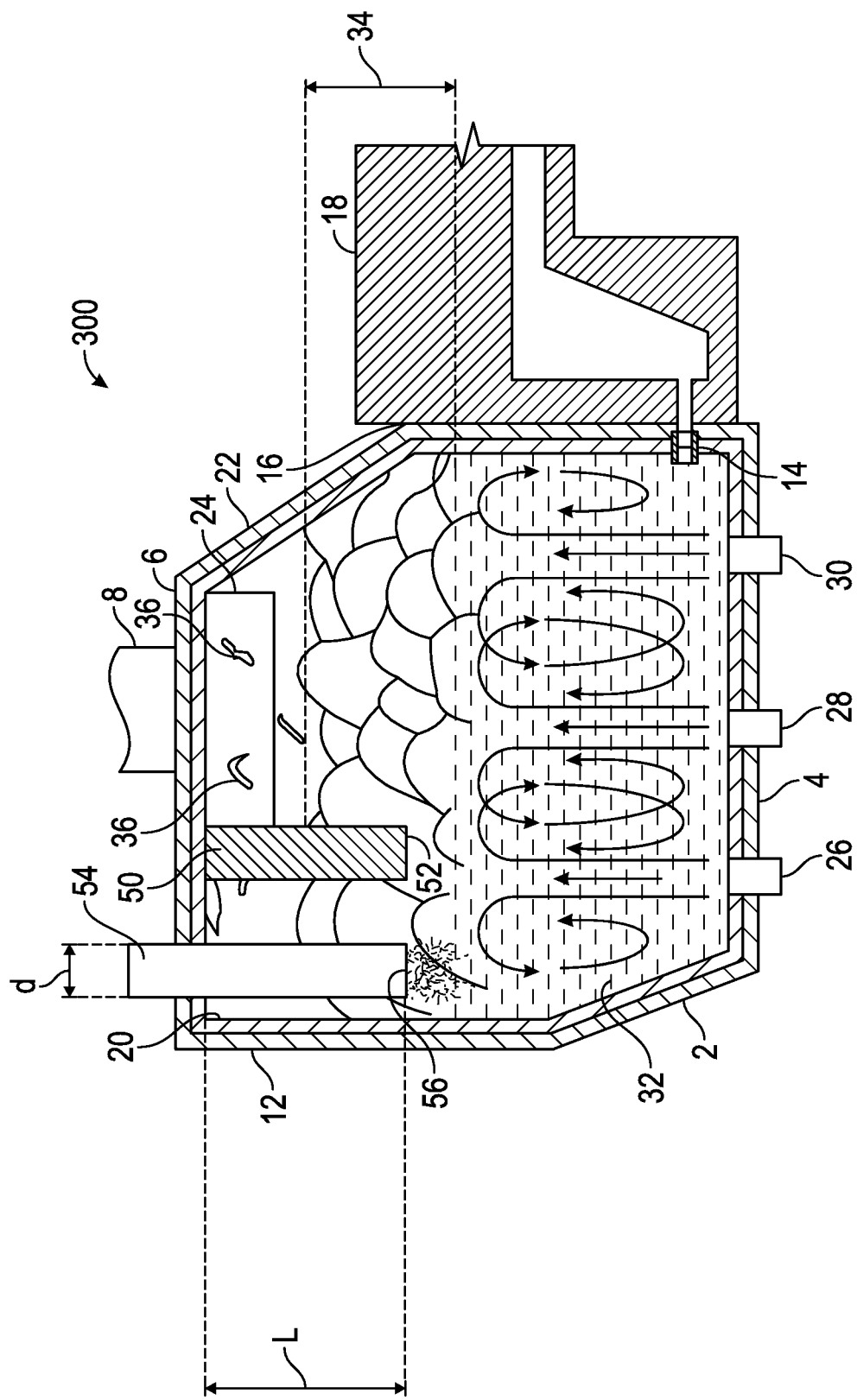
FIG. 5 is a schematic side elevation view, partially in cross-section, of a third embodiment of a SCM in accordance with the present disclosure.
Figure 6:
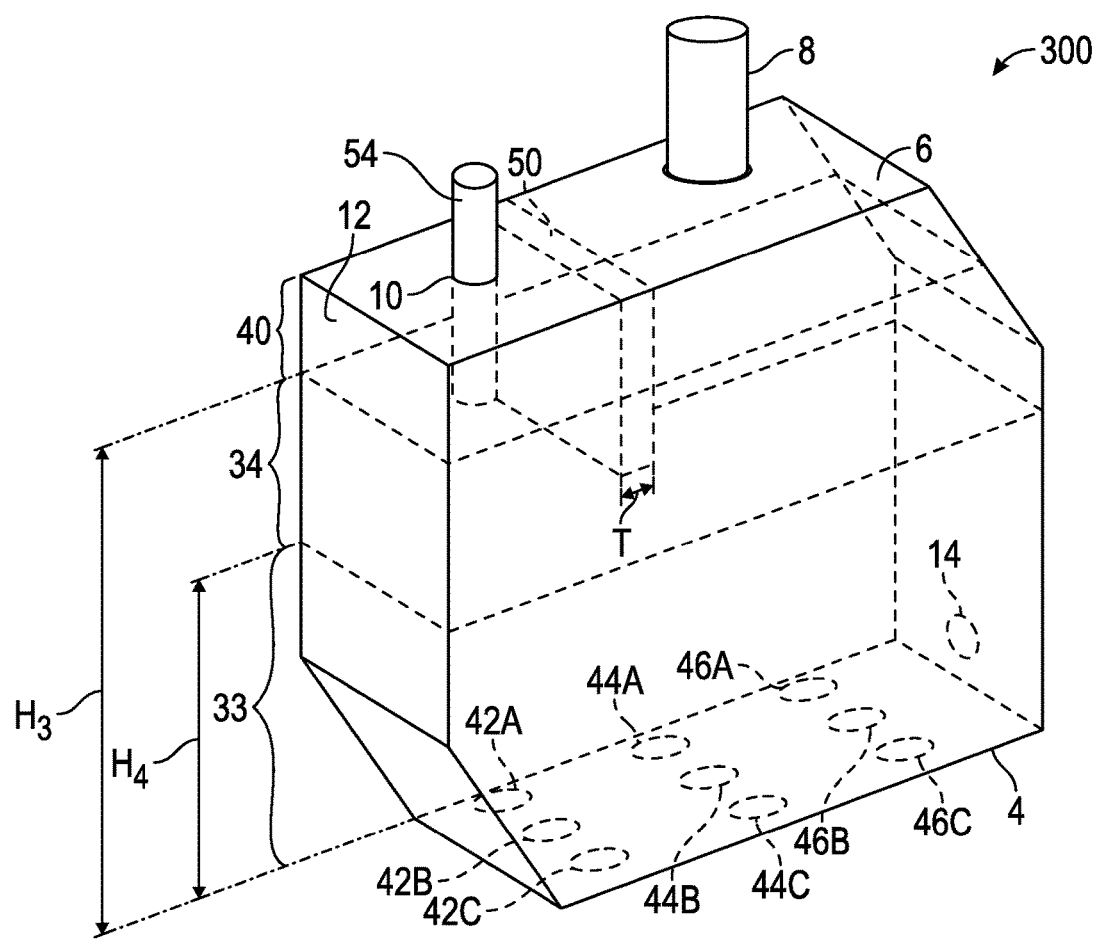
FIG. 6 is a schematic perspective view, partially in phantom, with some parts removed for clarity, of the SCM illustrated schematically in FIG. 5.

FIG. 5 is a schematic side elevation view, partially in cross-section, of a third embodiment 300 of a SCM in accordance with the present disclosure, and FIG. 6 is a schematic perspective view, partially in phantom, with some parts removed for clarity, of SCM embodiment 300. SCM embodiment 300 includes a baffle 50 having a distal end 52 that is submerged in splash region 34, as in embodiment 200, and further includes a vertical particulate feedstock conduit 54 inserted through a feed port 10 in ceiling 6. Particulate feedstock conduit 54 (there maybe more than one, and they need not be vertical) may have a distal end exit port 56 positioned in the splash region 34. Particulate feedstock conduit 54 has a length (L) that may be less than, equal to, or longer than a length of baffle 50, as long as the distal end of 52 (baffle) and 56 (particulate feedstock conduit) are positioned in splash region 34. Particulate feedstock conduit 54 has a diameter (d) that may range from about 0.5 to about 6 inches (about 1.3 to about 15 cm), and may be equipped with a pipe-in-pipe knife, actuator, and timer as described briefly in reference to FIG. 1, or a hydraulic ram feature to keep distal end port 56 open. During operation of SCM 300, particulate feedstock conduit 54 and baffle 50 advantageously work with splash region feeding to reduce or eliminate particulate feedstock entering through inlet port 56 from being entrained into melter exhaust.

Figure 7:
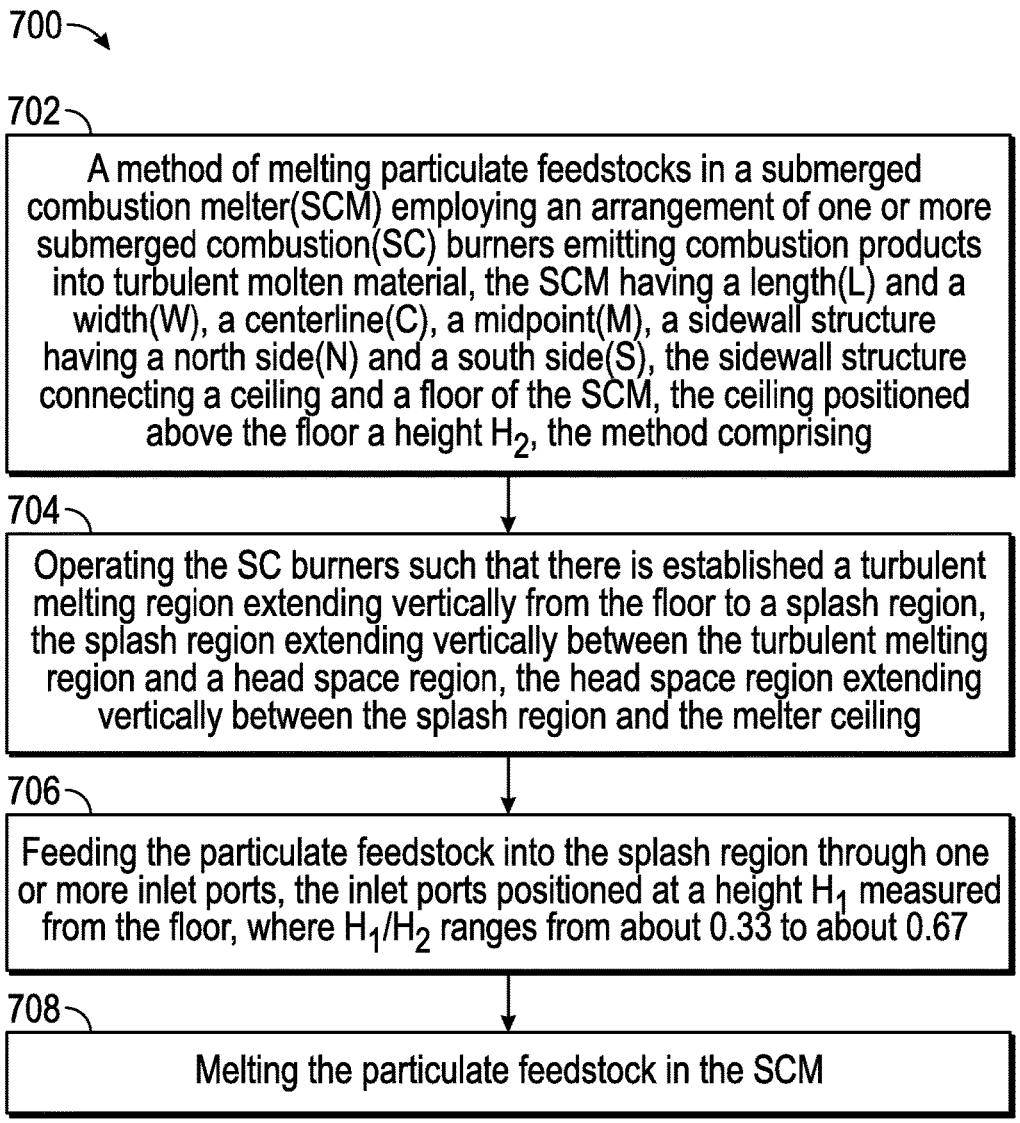

FIGS. 7, 8, 9, and 10 are logic diagrams illustrating various methods of the present disclosure. FIG. 7 illustrates a method 700, a method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2 (Box 702). Method embodiment 700 further comprises operating the SC burners such that there is established a turbulent melting region extending vertically from the floor to a splash region, the splash region extending vertically between the turbulent melting region and a head space region, the head space region extending vertically between the splash region and the melter ceiling (Box 704). Method embodiment 700 further comprises feeding the particulate feedstock into the splash region through one or more inlet ports, the inlet ports positioned at a height H1 measured from the floor, where H1/H2 ranges from about 0.33 to about 0.67 (Box 706), melting the particulate feedstock in the SCM (Box 708).

FIG. 8 illustrates a method 800, a method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2 (Box 802). Method embodiment 800 further comprises operating the SC burners such that there is established a turbulent melting region extending vertically from the floor to a splash region, the splash region extending vertically between the turbulent melting region and a head space region, the head space region extending vertically between the splash region and the melter ceiling (Box 804). Method embodiment 800 further comprises feeding the particulate feedstock into the splash region through a single feedstock inlet port in a feed end of the SCM positioned along the SCM centerline, the inlet port positioned at a height H1 measured from the floor, where H1/H2 ranges from about 0.33 to about 0.67 (Box 806), and melting the particulate feedstock in the SCM (Box 808).

Figure 9:
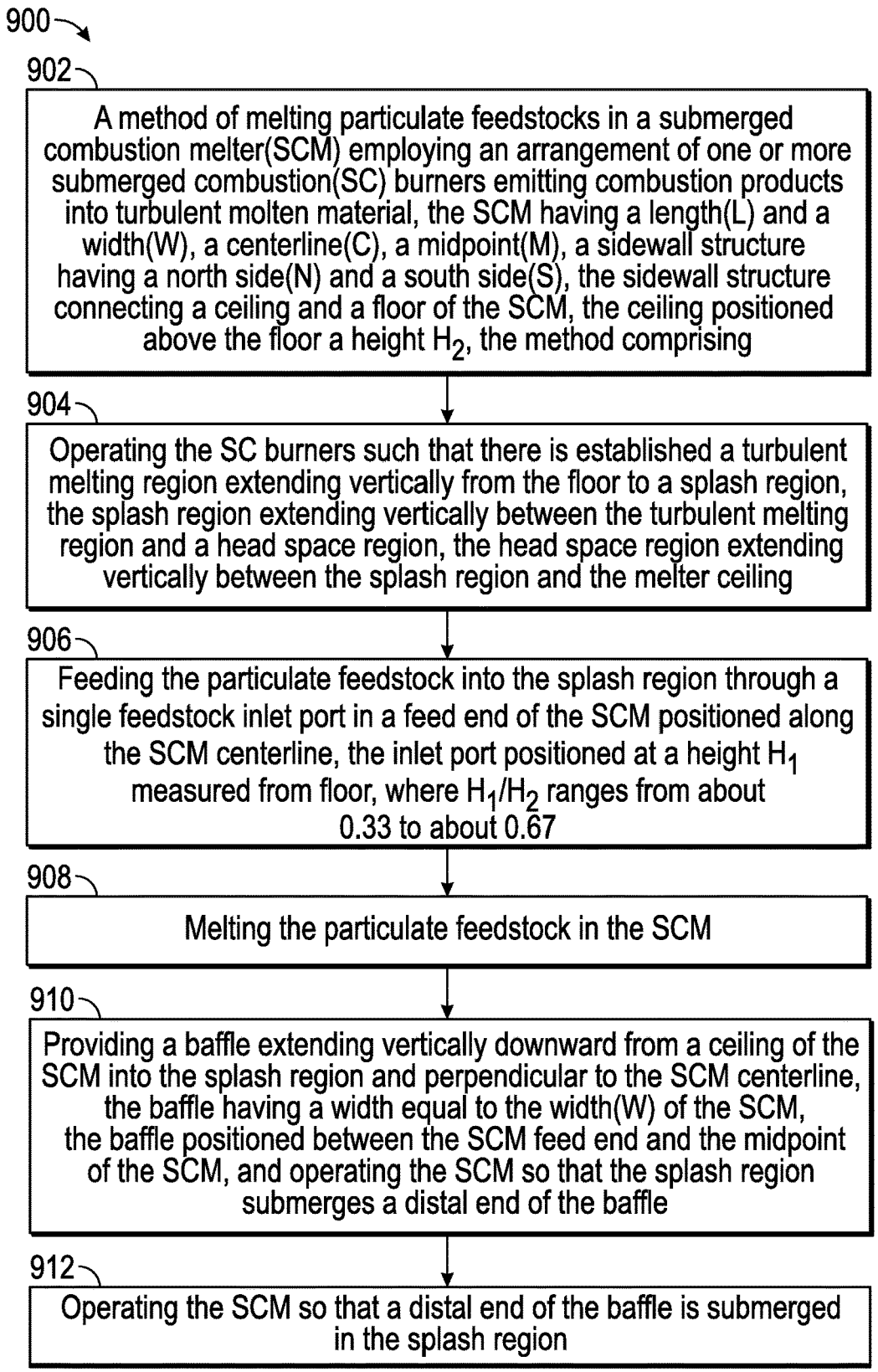

FIG. 9 illustrates a method 900, a method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, and an exhaust stack of the SCM attached to a ceiling of the SCM along the SCM centerline, the exhaust stack positioned between the midpoint and the exit end wall of the SCM (Box 902). Method embodiment 900 further comprises operating the SC burners such that there is established a turbulent melting region extending vertically from the floor to a splash region, the splash region extending vertically between the turbulent melting region and a head space region, the head space region extending vertically between the splash region and the melter ceiling (Box 904). Method embodiment 900 further comprises feeding the particulate feedstock into the splash region through a single feedstock inlet port in a feed end of the SCM positioned along the SCM centerline, the inlet port positioned at a height H1 measured from the floor, where H1/H2 ranges from about 0.33 to about 0.67 (Box 906). Method embodiment 900 further comprises melting the particulate feedstock in the SCM (908). Method embodiment 900 further comprises providing a baffle extending vertically downward from a ceiling of the SCM into the splash region and perpendicular to the SCM centerline, the baffle having a width equal to the width (W) of the SCM, the baffle positioned between the SCM feed end and the midpoint of the SCM, and operating the SCM so that the splash region submerges a distal end of the baffle (910), and operating the SCM so that a distal end of the baffle is submerged in the splash region (912).

Figure 10:
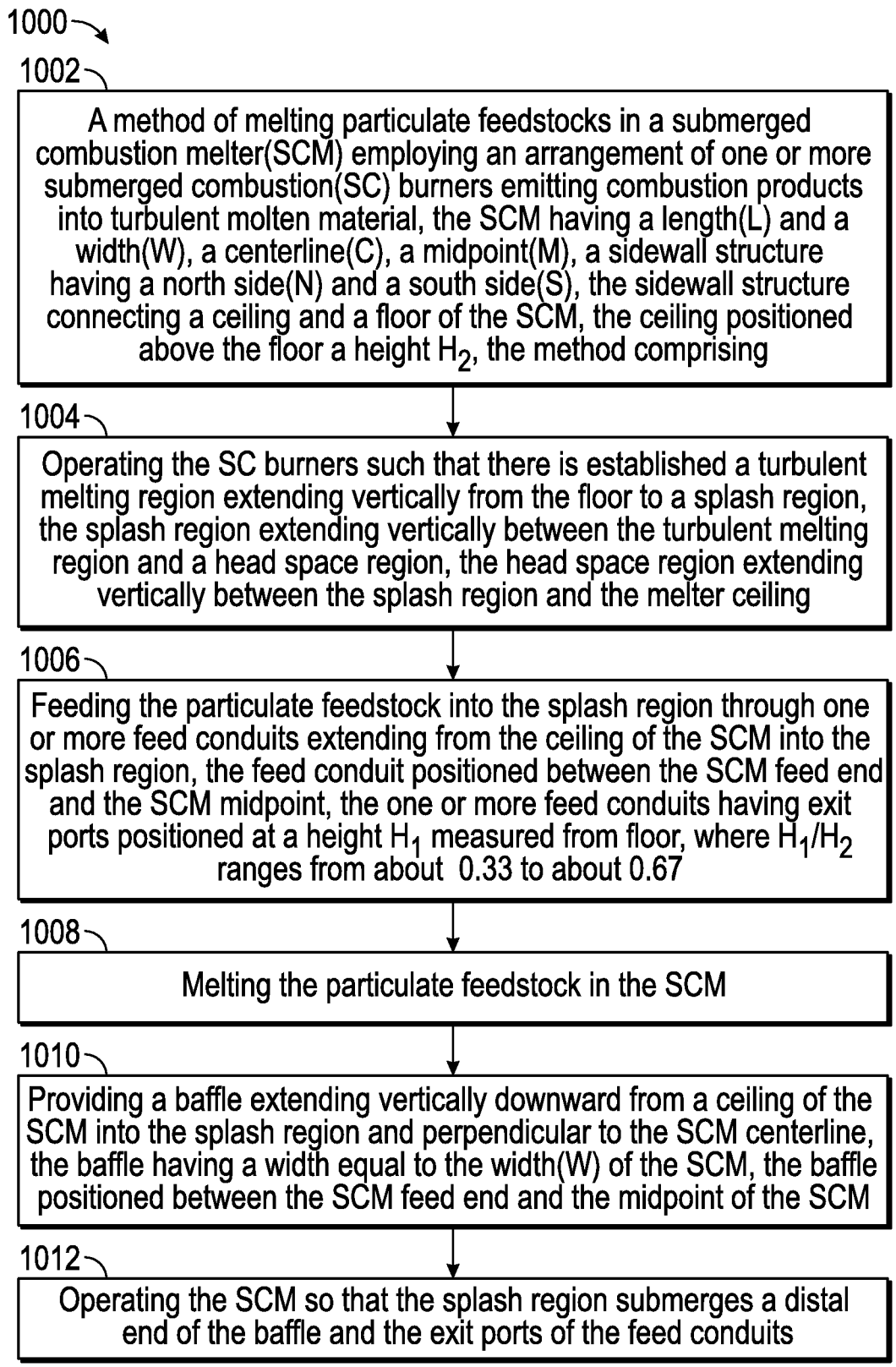

FIG. 10 illustrates a method 1000, a method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, and an exhaust stack of the SCM attached to a ceiling of the SCM along the SCM centerline, the exhaust stack positioned between the midpoint and the exit end wall of the SCM (Box 1002). Method embodiment 1000 further comprises operating the SC burners such that there is established a turbulent melting region extending vertically from the floor to a splash region, the splash region extending vertically between the turbulent melting region and a head space region, the head space region extending vertically between the splash region and the melter ceiling (Box 1004). Method embodiment 1000 further comprises feeding the particulate feedstock into the splash region through one or more feed conduits extending from the ceiling of the SCM into the splash region, the feed conduit positioned between the SCM feed end and the SCM midpoint, the one or more feed conduits having exit ports positioned at a height H1 measured from the floor, where H1/H2 ranges from about 0.33 to about 0.67 (Box 1006). Method embodiment 1000 further comprises melting the particulate feedstock in the SCM (Box 1008), providing a baffle extending vertically downward from a ceiling of the SCM into the splash region and perpendicular to the SCM centerline, the baffle having a width equal to the width (W) of the SCM, the baffle positioned between the SCM feed end and the midpoint of the SCM (Box 1010), and operating the SCM so that the splash region submerges a distal end of the baffle and the exit ports of the feed conduits (Box 1012).

In operation, flow of feedstock (including particulate feedstock) into the SCM may be continuous, semi-continuous, semi-batch, or batch. For example, in certain embodiments feedstock could flow into a feedstock heat exchange substructure until the feedstock heat exchange substructure is partially full or completely full of feedstock, then the pre-heated feedstock may be dumped into the SCM. One way of accomplishing that may be by use of a grating at the bottom of a feedstock heat exchange substructure having openings slightly smaller than the feedstock particle size. Such an arrangement is disclosed in Applicant's U.S. Pat. No. 9,815,726, issued Nov. 14, 2017, incorporated by reference herein.

The initial raw material feedstock may include any material suitable for forming molten inorganic materials. In certain embodiments where the feedstock is pre-heated by melter exhaust, some non-particulate feedstock may have a weight average particle size such that most if not all of the feedstock is not fluidized when traversing through the heat exchange structure or exhaust conduit serving as the heat exchange structure. Such materials may include glass precursors or other non-metallic inorganic materials, such as, for example, limestone, glass cullet, feldspar, basalt or other rock wool forming material, and mixtures thereof. Typical examples of basalt that are compositionally stable and available in large quantities are reported in U.S. Patent Publication 2012/0104306, namely an ore having a larger amount of $SiO_2$ (A, for high-temperature applications) and an ore having a smaller amount of $SiO_2$ (B, for intermediate-temperature applications), both of which have approximately the same amount of $Al_2O_3$. Although ore A can be spun into fiber, the resultant basalt fiber has heat-resistance problem at temperature ranges exceeding 750° C. Ore B, on the other hand, is associated with higher energy cost for mass production of fiber. The basalt rock material feedstock for use on the systems and methods of the present disclosure may be selected from: (1) high-temperature ore (A) having substantially the same amount of $Al_2O_3$ and a larger amount of $SiO_2$; (2) intermediate-temperature ore (B) having substantially the same amount of $Al_2O_3$ and a smaller amount of $SiO_2$; and (3) a mixture of the high-temperature basalt rock ore (A) and the intermediate-temperature basalt rock ore (B).

Basalt rock (basalt ore) is an igneous rock. According to U.S. Patent Publication 2012/0104306, major examples of the constituent mineral include: (1) plagioclase: $Na(AlSi_3O_8)$—$Ca(Al_2SiO_8)$; (2) pyroxene: $(Ca, Mg, Fe^{2+}, Fe^{3+}, N, Ti)_2[(Si, Al)_2O_6]$; and (3) olivine: $(Fe, Mg)_2SiO_4$. Ukrainian products are inexpensive and good-quality.

Tables 1 and 2 (from U.S. Patent Publication 2012/0104306) show examples of element ratios (wt. %) and the oxide-equivalent composition ratios (wt. %) determined by ICP analysis (using an inductively-coupled plasma spectrometer ICPV-8100 by Shimadzu Corporation) performed on a high-temperature basalt ore (for high-temperature applications), an intermediate-temperature basalt ore (for intermediate-temperature applications), and a glass consisting of 85% high-temperature ore and 15% intermediate-temperature ore.

TABLE 1

|    | Ore (for high-temp.) (wt %) | Ore (for intermediate-temp.) (wt %) | Ore (for high-temp.) 85 wt % Ore (for intermediate-temp.) 15 wt % (wt %) |
|----|-----|-----|-----|
| Si | 23.5~28.8 | 23.5~28.5 | 25.0~28.8 |
| Al | 8.7~9.3 | 8.7~9.3 | 9.0~9.5 |
| Fe | 6.0~6.6 | 6.0~7.1 | 5.7~6.7 |
| Ca | 4.0~4.5 | 5.6~6.1 | 4.2~4.7 |
| Na | 2.1~2.3 | 1.8~2.0 | 2.0~2.3 |
| K  | 1.4~1.8 | 1.2~1.5 | 1.4~1.9 |
| Mg | 0.1~1.6 | 1.4~3.0 | 1.5~1.7 |
| Ti | 0.4~0.6 | 0.5~0.7 | 0.4~0.6 |
| Mn | 0.1~0.2 | 0.1~0.2 | 0.1~0.2 |
| P  | 0.05~0.10 | 0.05~0.09 | 0.07~0.10 |
| B  | 0.02~0.08 | 0.01~0.06 | 0.03~0.10 |
| Ba | 0.03~0.05 | 0.03~0.05 | 0.09 |
| Sr | 0.02~0.04 | 0.02~0.04 | 0.02~0.05 |
| Zr | 0.01~0.04 | 0.01~0.04 | 0.01~0.03 |
| Cr | 0.01~0.03 | 0.01~0.03 | 0.01~0.03 |
| S  | 0.01~0.03 | 0.01~0.03 | 0.01~0.03 |

TABLE 2

|    | Ore (for high-temp.) (wt %) | Ore (for intermediate-temp.) (wt %) | Ore (for high-temp.) 85 wt % Ore (for intermediate-temp.) 15 wt % (wt %) |
|----|-----|-----|-----|
| $SiO_2$ | 57.1~61.2 | 54.0~58.2 | 57.7~60.6 |
| $Al_2O_3$ | 16.1~19.2 | 14.9~18.1 | 16.5~18.9 |
| $FeO + Fe_2O_3$ | 8.0~9.7 | 8.1~9.6 | 7.7~9.6 |
| CaO | 5.5~6.8 | 7.5~8.8 | 5.8~7.0 |
| $Na_2O$ | 2.8~3.3 | 2.2~2.9 | 2.6~3.2 |
| $K_2O$ | 1.8~2.1 | 1.4~1.8 | 1.8~2.2 |
| MgO | 0.20~2.5 | 1.4~4.8 | 0.2~2.8 |
| $TiO_2$ | 0.7~1.0 | 0.8~1.1 | 0.1~0.3 |
| MnO | 0.1~0.3 | 0.1~0.3 | 0.1~0.3 |
| $P_2O_5$ | 0.1~0.3 | 0.1~0.3 | 0.1~0.3 |
| $B_2O_3$ | 0.1~0.3 | 0.04~0.20 | 0.04~0.30 |
| BaO | 0.03~0.07 | 0.02~0.06 | 0.03~0.12 |
| SrO | 0.02~0.06 | 0.02~0.07 | 0.01~0.06 |
| $ZrO_2$ | 0.02~0.05 | 0.02~0.05 | 0.01~0.30 |
| $Cr_2O_3$ | 0.01~0.05 | 0.01~0.05 | 0.01~0.04 |
| SO | 0.01~0.03 | 0.01~0.03 | 0.01~0.03 |

In embodiments wherein glass batch is used as sole or as a supplemental feedstock, one glass composition for producing glass fibers is "E-glass," which typically includes 52-56% $SiO_2$, 12-16% $Al_2O_3$, 0-0.8% $Fe_2O_3$, 16-25% CaO, 0-6% MgO, 0-10% $B_2O_3$, 0-2% $Na_2O+K_2O$, 0-1.5% $TiO_2$ and 0-1% $F_2$. Other glass batch compositions may be used, such as those described in Applicant's U.S. Patent Publication 2008/0276652.

As noted herein, submerged combustion burners and burner panels may produce violent or aggressive turbulence of the molten inorganic material in the SCM and may result in sloshing or splashing of molten material, pulsing of combustion burners, popping of large bubbles above submerged burners, ejection of molten material from the melt against the walls and ceiling of melter, and the like. Frequently, one or more of these phenomena may result in undesirably short life of temperature sensors and other components used to monitor a submerged combustion melter's operation, making monitoring difficult, and use of signals from these sensors for melter control all but impossible for more than a limited time period. Processes and systems of the present disclosure may include indirect measurement of melt temperature in the melter itself, as disclosed in Applicant's U.S. Pat. No. 9,096,453, using one or more thermocouples for monitoring and/or control of the melter, for example using a controller. A signal may be transmitted by wire or wirelessly from a thermocouple to a controller, which may control the melter by adjusting any number of parameters, for example feed rate of a feedstock feeder may be adjusted through a signal, and one or more of fuel and/or oxidant conduits may be adjusted via a signal, it being understood that suitable transmitters and actuators, such as valves and the like, are not illustrated for clarity.

Melter apparatus in accordance with the present disclosure may also comprise one or more wall-mounted submerged combustion burners, and/or one or more roof-mounted non-submerged burners (not illustrated). Roof-mounted burners may be useful to pre-heat the melter apparatus melting zone, and serve as ignition sources for one or more submerged combustion burners and/or burner panels. Roof-mounted burners may be oxy-fuel burners, but as they are only used in certain situations, are more likely to be air/fuel burners. Most often they would be shut-off after pre-heating the melter and/or after starting one or more submerged combustion burners. In certain embodiments, one or more roof-mounted burners could be used supplementally with a baffle (for example, when the baffle requires service) to form a temporary curtain to prevent particulate carryover. In certain embodiments, all submerged combustion burners and burner panels may be oxy/fuel burners or oxy-fuel burner panels (where "oxy" means oxygen, or oxygen-enriched air, as described earlier), but this is not necessarily so in all embodiments; some or all of the submerged combustion burners or burner panels may be air/fuel burners. Furthermore, heating may be supplemented by electrical (Joule) heating in certain embodiments, in certain melter zones.

Certain SCM embodiments may comprise burner panels as described in Applicant's U.S. application Ser. No. 14/838,148, filed Aug. 27, 2015, comprising a burner panel body and one or more sets of concentric conduits for flow of oxidant and fuel. Certain burner panels disclosed therein include those wherein the outer conduit of at least some of the sets of concentric conduits are oxidant conduits, and the at least one inner conduit is one or more fuel conduits. Certain burner panel embodiments may comprise non-fluid cooled or fluid-cooled protective members comprising one or more noble metals. Certain burner panel embodiments may comprise non-fluid cooled or fluid-cooled protective members consisting essentially of one or more noble metals. Certain burner panel embodiments may comprise non-fluid cooled or fluid-cooled protective members consisting of one or more noble metals. Certain burner panel embodiments may comprise those wherein the lower fluid-cooled portion and the upper non-fluid cooled portion are positioned in layers, with the lower fluid-cooled portion supporting the sets of conduits and the associated protective members. Certain burner panel embodiments may comprise those wherein the non-fluid cooled protective member is a shaped annular disk having a through passage, the through passage of the shaped annular disk having an internal diameter substantially equal to but not larger than an internal diameter of the outer conduit. Certain burner panel embodiments may comprise those wherein an internal surface of the through passage of the shaped annular disk and a portion of a top surface of the shaped annular disk are not submerged by the fluid-cooled or non-fluid-cooled portions of the panel body. Certain combustion burner panels may comprise a panel body having a first major surface defined by a lower fluid-cooled portion of the panel body, and a second major surface defined by an upper non-fluid cooled portion of the panel body, the panel body having at least one through passage extending from the first to the second major surface, the through passage diameter being greater in the lower fluid-cooled portion than in the upper non-fluid cooled portion, the panel body supporting at least one set of substantially concentric at least one inner conduit and an outer conduit, each conduit comprising proximal and distal ends, the at least one inner conduit forming a primary passage and the outer conduit forming a secondary passage between the outer conduit and the at least one inner conduit; and a fluid-cooled protective member associated with each set and having connections for coolant fluid supply and return, each fluid-cooled protective member positioned adjacent at least a portion of the circumference of the outer conduit between the proximal and distal ends thereof at approximately a position of the fluid-cooled portion of the panel body. Certain burner panel embodiments may comprise those wherein each fluid-cooled protective member is a fluid-cooled collar having an internal diameter about the same as an external diameter of the outer conduit, the fluid-cooled collar having an external diameter larger than the internal diameter. Certain burner panel embodiments may comprise a mounting sleeve. In certain burner panel embodiments the mounting sleeve having a diameter at least sufficient to accommodate the external diameter of the fluid-cooled collar. In certain embodiments, the burner panel may include only one or more fuel conduits, or only one or more oxidant conduits. These embodiments may be paired with other panels supplying fuel or oxidant (as the case might be), the pair resulting in combustion of the fuel from one panel with the oxidant from the other panel. In certain embodiments the burner panel may comprise a pre-disposed layer or layers of glass, ceramic, refractory, and/or refractory metal or other protective material as a protective skull over the non-fluid cooled body portion or layer. The layer or layers of protective material may or may not be the same as the material to be melted in the SCM.

Suitable materials for glass-contact refractory, which may be present in SCMs, burners, and burner panels useful herein, include AZS (alumina-zirconia-silica), α/β alumina, zirconium oxide, chromium oxide, chrome corundum, so-called "dense chrome", and the like. One "dense chrome" material is available from Saint Gobain under the trade name SEFPRO, such as C1215 and C1221. Other useable "dense chrome" materials are available from the North American Refractories Co., Cleveland, Ohio (U.S.A.) under the trade designations SERV 50 and SERV 95. Other suitable materials for components that require resistance to high temperatures are fused zirconia ($ZrO_2$), fused cast AZS (alumina-zirconia-silica), rebonded AZS, or fused cast alumina ($Al_2O_3$). The choice of a particular material may be dictated by the geometry of the apparatus, the type of material being produced, operating temperature, burner body panel geometry, and type of glass or other product being produced.

The term "fluid-cooled" means use of any coolant fluid (heat transfer fluid) to transfer heat away from the equipment in question, other than ambient air that resides naturally on the outside of the equipment. For example, portions of or the entire panels of sidewall structure, floor, and ceiling of the SCM, baffles, portions or all of heat transfer substructures used to preheat feedstock (for example nearest the melter), portions of feedstock supply conduits, and portions of SC burners, and the like may require fluid cooling. Heat transfer fluids may be any gaseous, liquid, slurry, or some combination of gaseous, liquid, and slurry compositions that functions or is capable of being modified to function as a heat transfer fluid. Gaseous heat transfer fluids may be selected from air, including ambient air and treated air (for example, air treated to remove moisture), inorganic gases, such as nitrogen, argon, and helium, organic gases such as fluoro-, chloro- and chlorofluorocarbons, including perfluorinated versions, such as tetrafluoromethane, and hexafluoroethane, and tetrafluoroethylene, and the like, and mixtures of inert gases with small portions of non-inert gases, such as hydrogen. Heat transfer liquids and slurries may be selected from liquids and slurries that may be organic, inorganic, or some combination thereof, for example, water, salt solutions, glycol solutions, oils and the like. Other possible heat transfer fluids include steam (if cooler than the expected glass melt temperature), carbon dioxide, or mixtures thereof with nitrogen. Heat transfer fluids may be compositions comprising both gas and liquid phases, such as the higher chlorofluorocarbons. Certain SCMs and method embodiments of this disclosure may include fluid-cooled panels such as disclosed in Applicant's U.S. Pat. No. 8,769,992.

Certain systems and processes of the present disclosure may utilize measurement and control schemes such as described in Applicant's U.S. Pat. No. 9,096,453, and/or feed batch densification systems and methods as described in Applicant's U.S. Pat. No. 9,643,869. Certain SCMs and processes of the present disclosure may utilize devices for delivery of treating compositions such as disclosed in Applicant's U.S. Pat. No. 8,973,405.

Certain SCM and method embodiments of this disclosure may be controlled by one or more controllers. For example, combustion (flame) temperature may be controlled by monitoring one or more parameters selected from velocity of the fuel, velocity of the primary oxidant, mass and/or volume flow rate of the fuel, mass and/or volume flow rate of the primary oxidant, energy content of the fuel, temperature of the fuel as it enters burners or burner panels, temperature of the primary oxidant as it enters burners or burner panels, temperature of the effluent (exhaust) at melter exhaust exit, pressure of the primary oxidant entering burners or burner panels, humidity of the oxidant, burner or burner panel geometry, combustion ratio, and combinations thereof. Certain SCMs and processes of this disclosure may also measure and/or monitor feed rate of batch or other feedstock materials, such as rock wool or mineral wool feedstock, glass batch, cullet, mat or wound roving and treatment compositions, mass of feed, and use these measurements for control purposes. Flow diverter positions may be adjusted or controlled to increase heat transfer in heat transfer substructures and exhaust conduits.

Various conduits, such as feedstock supply conduits, exhaust conduits, oxidant and fuel conduits of burners or burner panels of the present disclosure may be comprised of metal, ceramic, ceramic-lined metal, or combination thereof. Suitable metals include carbon steels, stainless steels, for example, but not limited to, 306 and 316 steel, as well as titanium alloys, aluminum alloys, and the like. High-strength materials like C-110 and C-125 metallurgies that are NACE qualified may be employed for burner body components. (As used herein, "NACE" refers to the corrosion prevention organization formerly known as the National Association of Corrosion Engineers, now operating under the name NACE International, Houston, Tex.) Use of high strength steel and other high strength materials may significantly reduce the conduit wall thickness required, reducing weight of the conduits and/or space required for conduits. In certain locations, precious metals and/or noble metals (or alloys) may be used for portions or all of these conduits. Noble metals and/or other exotic corrosion and/or fatigue-resistant materials such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal may be employed. In certain embodiments a protective layer or layers or components may comprise an 80 wt. percent platinum/20 wt. percent rhodium alloy attached to a base metal using brazing, welding or soldering of certain regions, as further explained in Applicant's U.S. application Ser. No. 14/1778.206, filed Sep. 18, 2015.

The choice of a particular material is dictated among other parameters by the chemistry, pressure, and temperature of fuel and oxidant used and type of melt to be produced with certain feedstocks. The skilled artisan, having knowledge of the particular application, pressures, temperatures, and available materials, will be able design the most cost effective, safe, and operable heat transfer substructures, feedstock and exhaust conduits, burners, burner panels, and melters for each particular application without undue experimentation.

The total quantities of fuel and oxidant used by burners or burner panels of the present disclosure may be such that the flow of oxygen may range from about 0.9 to about 1.2 of the theoretical stoichiometric flow of oxygen necessary to obtain the complete combustion of the fuel flow. Another expression of this statement is that the combustion ratio may range from about 0.9 to about 1.2. The amount of heat needed to be produced by combustion of fuel in the melter (and/or Joule heating) will depend upon the efficiency of the preheating of the feedstock in the feedstock heat exchange substructure. The larger the amount of heat transferred to the feedstock, the lower the heat energy required in the melter from the fuel and/or Joule elements. When operating "lean", the combustion ratio is above about 1.0, or above about 1.5, or above about 2.0, or above about 2.5. When operating "rich", the combustion ratio is below about 1.0, or below about 0.9, or below about 0.8, or below about 0.7, or below about 0.6, or below about 0.5, or below about 0.2.

In SCMs, the velocity of the fuel in the various burners and/or burner panel embodiments depends on the burner/burner panel geometry used, but generally is at least about 15 meters/second (m/s). The upper limit of fuel velocity depends primarily on the desired penetration of flame and/or combustion products into the glass melt and the geometry of the burner panel; if the fuel velocity is too low, the flame temperature may be too low, providing inadequate temperature in the melter, which is not desired, and if the fuel flow is too high, flame and/or combustion products might impinge on a melter wall or roof, or cause carryover of melt into the exhaust, or be wasted, which is also not desired. Baffles may be provided extending from the roof, and/or in the melter exhaust conduit, such as in the heat exchange substructure, in order to safeguard against this. Similarly, oxidant velocity should be monitored so that flame and/or combustion products do not impinge on an SCM wall or roof, or cause carryover of melt into the exhaust, or be wasted. Oxidant velocities depend on fuel flow rate and fuel velocity, but in general should not exceed about 200 ft/sec at 400 scfh flow rate.

Certain method embodiments may be combined with methods from Applicant's U.S. Pat. No. 9,982,884, issued May 29, 2018, for example operating the arrangement of SC burners such that a progressively higher percentage of a total combustion flow from the SC burners occurs from SC burners at progressively downstream positions; or melting using an arrangement of two or more SC burners comprises melting with a matrix of at least two rows and at least two columns of SC burners wherein a row spans a majority of the width (W) and a column spans a majority of the length (L) of the SCM, and wherein the operating is selected from the group consisting of:
(a) each SC burner in a first row R1 operates at a rate $r_1$, each SC burner in a second row R2 operates at a rate $r_2$, wherein $r_2 > r_1$, and
(b) if the matrix is a two row by three column matrix or larger, SC burners on the N and S sides in the first row R1 operate at a rate $r_3$, the SC burner in the center (C) of the first row R1 operates at a rate $r_4$, where $r_3 > r_4$, and SC burners on N and S sides in a second row R2 operate at a rate $r_5$ and the SC burner in the center (C) operates at a rate $r_6$, where $r_5 > r_6 > r_4$, and $r_5 > r_3$.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating comprises
(c) each SC burner in a first row R1 operates at a rate $r_1$, each SC burner in a second row R2 operates at a rate $r_2$, wherein $r_2 > r_1$.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating comprises
(d) if the matrix is a two row by three column matrix or larger, SC burners on the N and S sides in the first row R1 operate at a rate $r_3$, and SC burners in the center (C) of the first row operate at a rate $r_4$, where $r_3 > r_4$, and SC burners on N and S sides in a second row R2 operate at a rate $r_5$ and SC burners in the center (C) operate at a rate $r_6$, where $r_5 > r_6 \geq r_4$, and $r_5 > r_3$.

Certain method embodiments may further comprise measuring concentration of a tracer compound or element in melt exiting the SCM to verify an increase in residence time of melt in the SCM compared to residence time of the melt when all SC burners are firing equally. In certain methods, the tracer compound or element may be selected from the group consisting of ZnO (zinc oxide), $SrCO_3$ (strontium carbonate), BaCO$_3$ (barium carbonate), and Li$_2$CO$_3$ (lithium carbonate), and mixtures and combinations thereof.

Certain method embodiments may include maximizing mixing and melting in an SCM, the method comprising (or consisting essentially of, or consisting of):
(a) melting an inorganic feedstock in an SCM using an arrangement of two or more SC burners, the SCM having a length (L) and a width (W), a centerline (C), a north side (N) and a south side (S); and
(b) operating the arrangement of SC burners such that a progressively lower percentage of total combustion flow rate from the SC burners occurs from SC burners at progressively downstream positions from the feed end of the SCM up to a midpoint (M) of the SCM length (L), and such that a progressively higher percentage of total combustion flow rate from the SC burners occurs from SC burners at progressively downstream positions from the midpoint (M) to the melt exit end of the SCM.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM, and wherein the operating the arrangement of SC burners comprises operating the SC burners such that SC burners nearer the feed end of the SCM have a flow rate $r_7$, SC burners near the melt exit end have a flow rate $r_8$, and SC burners near an intersection of L and M have a flow rate $r_9$, wherein:

$r_7 > r_9$ $r_8 > r_9$, and $r_8 \geq r_7$.

Certain method embodiments may include wherein the matrix is a 3 row×3 column matrix, and SC burners on the N and S sides have flow rate greater than the center SC burners.

Certain method embodiments may include maximizing mixing and temperature increase in an SCM, the method comprising (or consisting essentially of, or consisting of):
(a) melting an inorganic feedstock in an SCM using an arrangement of two or more SC burners, the SCM having a length (L) and a width (W), a centerline (C), a north side (N) and a south side (S); and
(b) operating the arrangement of SC burners such that SC burners in a first zone of the SCM operate fuel lean, and SC burners in a second zone of the SCM operate fuel rich, and where combustion products of the SC burners in the first zone mix with combustion products of the SC burners of the second zone at a position in the SCM higher than where the lean or rich combustion takes place.

Certain method embodiments may include wherein the melting using an arrangement of two or more SC burners comprises melting with a matrix of at least two rows and at least two columns of SC burners wherein a row spans a majority of the width (W) and a column spans a majority of the length (L) of the SCM.

Certain method embodiments may include wherein the matrix is a 3 row by 3 column matrix and the first zone is at a midpoint (M) of the SCM length (L), and the second zone is downstream of the midpoint (M) of the SCM length (L).

Certain method embodiments may include wherein the matrix is a 3 row by 3 column matrix and the first zone is at a midpoint (M) of the SCM length (L), and the second zone is upstream of the midpoint (M) of the SCM length (L).

Certain method embodiments may include wherein the first (lean) zone is near the feed inlet, and the second (fuel rich) zone is immediately downstream the first zone, and including feeding small (less than 1 mm APS) particle size batch material to the SCM in the feed inlet.

Certain method embodiments may include maximizing mixing without substantially increasing temperature in an SCM, the method comprising (or consisting essentially of, or consisting of):
(a) melting an inorganic feedstock in an SCM using an arrangement of two or more SC burners, the SCM having a length (L) and a width (W), a centerline (C), a north side (N) and a south side (S); and
(b) operating the arrangement of SC burners such that SC burners in a first zone of the SCM operate fuel lean, and SC burners in all other zones of the SCM operate neither fuel rich nor fuel lean.

Certain method embodiments may include wherein the lean zone is between the feed end of the SCM and the midpoint (M). Certain method embodiments may include wherein the lean zone is nearer the melter feed end than any other melting zone. Certain method embodiments may include wherein the lean zone is between the midpoint (M) and the melter exit end. Certain method embodiments may include wherein one or more SC burners is operated in pulsing mode. Certain method embodiments may include feeding large particle size feedstock (at least 10 cm APS) to the SCM inlet end.

Embodiments disclosed herein:

A: A method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, the method comprising:
(a) operating the SC burners such that there is established a turbulent melting region extending vertically from the floor to a splash region, the splash region extending vertically between the turbulent melting region and a head space region, the head space region extending vertically between the splash region and the melter ceiling;
(b) feeding the particulate feedstock into the splash region through one or more inlet ports, the inlet ports positioned at a height H1 measured from the floor, where H1/H2 ranges from about 0.33 to about 0.67; and
(c) melting the particulate feedstock in the SCM.

B: A method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, the method comprising:
(a) operating the SC burners such that there is established a turbulent melting region extending vertically from the floor to a splash region, the splash region extending vertically between the turbulent melting region and a head space region, the head space region extending vertically between the splash region and the melter ceiling;
(b) feeding the particulate feedstock into the splash region through a single feedstock inlet port in a feed end of the SCM positioned along the SCM centerline, the inlet port positioned at a height H1 measured from the floor, where H1/H2 ranges from about 0.33 to about 0.67; and
(c) melting the particulate feedstock in the SCM.

C: A method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, and an exhaust stack of the SCM attached to a ceiling of the SCM along the SCM centerline, the exhaust stack positioned between the midpoint and the exit end wall of the SCM, the method comprising:
(a) operating the SC burners such that there is established a turbulent melting region extending vertically from the floor to a splash region, the splash region extending vertically between the turbulent melting region and a head space region, the head space region extending vertically between the splash region and the melter ceiling;
(b) feeding the particulate feedstock into the splash region through a single feedstock inlet port in a feed end of the SCM positioned along the SCM centerline, the inlet port positioned at a height H1 measured from the floor, where H1/H2 ranges from about 0.33 to about 0.67;
(c) melting the particulate feedstock in the SCM;
(d) providing a baffle extending vertically downward from a ceiling of the SCM into the splash region and perpendicular to the SCM centerline, the baffle having a width equal to the width (W) of the SCM, the baffle positioned between the SCM feed end and the midpoint of the SCM;
(e) operating the SCM so that a distal end of the baffle is submerged in the splash region.

D: A method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, and an exhaust stack of the SCM attached to a ceiling of the SCM along the SCM centerline, the exhaust stack positioned between the midpoint and the exit end wall of the SCM, the method comprising:
(a) operating the SC burners such that there is established a turbulent melting region extending vertically from the floor to a splash region, the splash region extending vertically between the turbulent melting region and a head space region, the head space region extending vertically between the splash region and the melter ceiling;
(b) feeding the particulate feedstock into the splash region through one or more feed conduits extending from the ceiling of the SCM into the splash region, the feed conduit positioned between the SCM feed end and the SCM midpoint, the one or more feed conduits having exit ports positioned at a height H1 measured from the floor, where H1/H2 ranges from about 0.33 to about 0.67;
(c) melting the particulate feedstock in the SCM;
(d) providing a baffle extending vertically downward from a ceiling of the SCM into the splash region and perpendicular to the SCM centerline, the baffle having a width equal to the width (W) of the SCM, the baffle positioned between the SCM feed end and the midpoint of the SCM; and
(e) operating the SCM so that the splash region submerges a distal end of the baffle and the exit ports of the feed conduits.

E: A submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H1, the SCM comprising:
(a) one or more particulate feedstock inlet ports, the inlet ports positioned at a height H2, where H2/H1 ranges from about 0.33 to about 0.67.

F: A submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H1, the SCM comprising:
(a) a single particulate feedstock inlet port in a feed end of the SCM positioned along the SCM centerline, the inlet port positioned at a height H2 measured form the SCM floor, where H2/H1 ranges from about 0.33 to about 0.67.

G: A submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H1, the SCM comprising:
(a) a single particulate feedstock inlet port in a feed end of the SCM positioned along the SCM centerline, the inlet port positioned at a height H2 measured form the SCM floor, where H2/H1 ranges from about 0.33 to about 0.67; and
(b) a baffle extending vertically downward from a ceiling of the SCM into the splash region and perpendicular to the SCM centerline, the baffle having a width equal to the width (W) of the SCM, the baffle positioned between the SCM feed end and the midpoint (M) of the SCM, an exhaust stack of the SCM attached to a ceiling of the SCM along the SCM centerline, the exhaust stack positioned between the midpoint and the exit end wall of the SCM.

H: A submerged combustion melter (SCM) equipped with one or more submerged combustion (SC) burners, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H1, the SCM comprising:
(a) one or more feed conduits having an inlet in the ceiling of the SCM and an exit positioned at a height H2 measured from the floor, where H2/H1 ranges from about 0.33 to about 0.67, the one or more feed conduit inlets positioned between the SCM feed end and the SCM midpoint;
(b) a baffle extending vertically downward from a ceiling of the SCM into the splash region and perpendicular to the SCM centerline, the baffle having a width equal to the width (W) of the SCM, the baffle positioned between the one or more feed conduits and the midpoint of the SCM,
(c) an exhaust stack attached to a ceiling of the SCM along the SCM centerline, the exhaust stack positioned between the midpoint (M) and the exit end wall of the SCM.

Each of the embodiments A, B, C, D, E, F, G, and H may have one or more of the following additional elements in any combination: Element 1: the feeding of the particulate feedstock into the splash region of the SCM is through a single feedstock inlet port in a feed end of the SCM positioned along the SCM centerline. Element 2: the feeding of the particulate feedstock into the splash region of the SCM is through a plurality of feedstock inlet ports in a feed end of the SCM positioned equidistant from the centerline. Element 3: the feeding of the particulate feedstock into the splash region of the SCM is through a single feedstock inlet port in a feed end of the SCM positioned along the centerline and another feedstock inlet port in the north side or south side. Element 4: providing a baffle extending vertically downward from a ceiling of the SCM into the splash region and perpendicular to the SCM centerline, the baffle having a width equal to the width (W) of the SCM, the baffle positioned between the SCM feed end and the midpoint (M) of the SCM, and operating the SCM so that the splash region submerges a distal end of the baffle, and allowing exhaust to flow out of an exhaust stack of the SCM attached to a ceiling of the SCM along the SCM centerline, the exhaust stack positioned between the midpoint (M) and the exit end wall of the SCM. Element 5: the feeding at least a portion of the particulate feedstock into a splash region of the SCM comprises deploying one or more feed conduits having an inlet in the ceiling and an outlet in the splash region, feeding the portion of the particulate feedstock though the one or more feed conduits, the one or more feed conduits positioned between the SCM feed end and the SCM midpoint (M), providing a baffle extending vertically downward from a ceiling of the SCM into the splash region and perpendicular to the SCM centerline, the baffle having a width equal to the width (W) of the SCM, the baffle positioned between the one or ore feed conduits and the SCM midpoint (M), and operating the SCM so that the splash region submerges the feed inlet conduit exit ends and a distal end of the baffle, and allowing exhaust to flow out of an exhaust stack of the SCM attached to a ceiling of the SCM along the SCM centerline, the exhaust stack positioned between the midpoint (M) and the exit end wall of the SCM. Element 6: feeding small (less than 1 mm APS) particle size batch material to the SCM into the at least one feed inlet port. Element 7: feeding large particle size feedstock (at least 10 cm APS) into the SCM through one or more auxiliary inlet ports in the inlet end. Element 7: H1/H2 ranges from about 0.4 to about 0.6. Element 8: operating the SCM such that the turbulent melting region extends vertically from the floor to the splash region a height H4, and the splash region extends vertically a height H3, where H2>H3>H4, and where H3>H1>H4. Element 9: operating the SCM such that H3/H4 ranges from about 1.1 to about 2.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. § 112, Section F, unless "means for" is explicitly recited together with an associated function. "Means for" clauses are intended to cover the structures, materials, and/or acts described herein as performing the recited function and not only structural equivalents, but also equivalent structures.

What is claimed is:

1. A method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, the method comprising:
   (a) operating the SC burners such that there is established a turbulent melting region extending vertically from the floor to a splash region, the splash region extending vertically between the turbulent melting region and a head space region, the head space region extending vertically between the splash region and the melter ceiling;
   (b) feeding particulate feedstock into the splash region through one or more inlet ports, the one or more inlet ports positioned at a height H1 measured from the floor, where H1/H2 ranges from about 0.33 to about 0.67;
   (c) providing a baffle extending vertically downward from the ceiling of the SCM into the splash region and perpendicular to the SCM centerline (C), the baffle having a width equal to the width (W) of the SCM, the baffle positioned between a feed end of the SCM and the midpoint (M) of the SCM;
   (d) operating the SCM so that the splash region submerges a distal end of the baffle, and allowing exhaust to flow out of an exhaust stack of the SCM attached to the ceiling of the SCM along the SCM centerline (C), the exhaust stack positioned between the midpoint (M) and an exit end wall of the SCM; and
   (e) melting the particulate feedstock in the SCM.

2. The method in accordance with claim 1 wherein the feeding of the particulate feedstock into the splash region of the SCM is through a single inlet port in the feed end of the SCM positioned along the SCM centerline (C).

3. The method in accordance with claim 1 wherein the feeding of the particulate feedstock into the splash region of the SCM is through a plurality of inlet ports in the feed end of the SCM positioned equidistant from the SCM centerline (C).

4. The method in accordance with claim 1 wherein the feeding of the particulate feedstock into the splash region of the SCM is through a single inlet port in the feed end of the SCM positioned along the SCM centerline (C) and another inlet port in the SCM north side (N) or south side (S).

5. The method in accordance with claim 1 comprising feeding small (less than 1 mm average particle size (APS)) batch material to the SCM into the one or more inlet ports.

6. The method in accordance with claim 1 comprising feeding large particle size feedstock (at least 10 cm average particle size (APS)) into the SCM through one or more auxiliary inlet ports in an inlet end wall of the SCM.

7. The method in accordance with claim 1 wherein H1/H2 ranges from about 0.4 to about 0.6.

8. The method in accordance with claim 1 comprising operating the SCM such that the turbulent melting region extends vertically from the floor to the splash region a height H4, and the splash region extends vertically from the floor a height H3, where H2 >H3 >H4, and where H3 >H1 >H4.

9. The method in accordance with claim 1 comprising operating the SCM such that the turbulent melting region extends vertically from the floor to the splash region a height H4, and the splash region extends vertically from the floor a height H3, and H3/H4 ranges from about 1.1 to about 2.

10. A method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, and an exhaust stack of the SCM attached to a ceiling of the SCM along the SCM centerline, the exhaust stack positioned between the midpoint and an exit end wall of the SCM, the method comprising:
  (a) operating the SC burners such that there is established a turbulent melting region extending vertically from the floor to a splash region, the splash region extending vertically between the turbulent melting region and a head space region, the head space region extending vertically between the splash region and the melter ceiling;
  (b) feeding the particulate feedstock into the splash region through a single feedstock inlet port in a feed end of the SCM positioned along the SCM centerline, the inlet port positioned at a height H1 measured from the floor, where H1/H2 ranges from about 0.33 to about 0.67;
  (c) melting the particulate feedstock in the SCM;
  (d) providing a baffle extending vertically downward from a ceiling of the SCM into the splash region and perpendicular to the SCM centerline, the baffle having a width equal to the width (W) of the SCM, the baffle positioned between the SCM feed end and the midpoint of the SCM;
  (e) operating the SCM so that a distal end of the baffle is submerged in the splash region.

11. The method in accordance with claim 10 including feeding small (less than 1 mm average particle size (APS)) particle size batch material into the SCM through the single feedstock inlet port.

12. A method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, and an exhaust stack of the SCM attached to the ceiling of the SCM along the SCM centerline, the exhaust stack positioned between the midpoint and an exit end wall of the SCM, the method comprising:
  (a) operating the SC burners such that there is established a turbulent melting region extending vertically from the floor to a splash region, the splash region extending vertically between the turbulent melting region and a head space region, the head space region extending vertically between the splash region and the melter ceiling;
  (b) feeding the particulate feedstock into the splash region through one or more feed conduits extending from the ceiling of the SCM into the splash region, the one or more feed conduits positioned between a feed end of the SCM and the SCM midpoint, the one or more feed conduits having exit ports positioned at a height H1 measured from the floor, where H1/H2 ranges from about 0.33 to about 0.67;
  (c) melting the particulate feedstock in the SCM;
  (d) providing a baffle extending vertically downward from a ceiling of the SCM into the splash region and perpendicular to the SCM centerline, the baffle having a width equal to the width (W) of the SCM, the baffle positioned between the feed end of the SCM and the midpoint of the SCM; and
  (e) operating the SCM so that the splash region submerges a distal end of the baffle and the exit ports of the one or more feed conduits.

13. The method in accordance with claim 10 or 12 comprising feeding large particle size feedstock (at least 10 cm average particle size (APS)) into the SCM through one or more auxiliary inlet ports in the feed end of the SCM.

14. A method of melting particulate feedstocks in a submerged combustion melter (SCM) employing an arrangement of one or more submerged combustion (SC) burners emitting combustion products into turbulent molten material, the SCM having a length (L) and a width (W), a centerline (C), a midpoint (M), a sidewall structure having a north side (N) and a south side (S), the sidewall structure connecting a ceiling and a floor of the SCM, the ceiling positioned above the floor a height H2, the method comprising:
  (a) operating the SC burners such that there is established a turbulent melting region extending vertically from the floor to a splash region, the splash region extending vertically between the turbulent melting region and a head space region, the head space region extending vertically between the splash region and the melter ceiling;
  (b) feeding particulate feedstock into the splash region through one or more feed conduits having an inlet in the ceiling and an exit positioned in the splash region at a height H1 measured from the floor, where H1/H2 ranges from about 0.33 to about 0.67, the one or more feed conduits positioned between an SCM feed end and the SCM midpoint (M);
  (c) providing a baffle extending vertically downward from the ceiling of the SCM into the splash region and perpendicular to the SCM centerline (C), the baffle having a width equal to the width (W) of the SCM, the baffle positioned between the one or more feed conduits and the SCM midpoint (M);
  (d) operating the SCM so that the splash region submerges the one or more feed conduit outlets and a distal end of the baffle;
  (e) allowing exhaust to flow out of an exhaust stack of the SCM attached to the ceiling of the SCM along the SCM centerline (C), the exhaust stack positioned between the midpoint (M) and an exit end wall of the SCM; and (f) melting the particulate feedstock in the turbulent melting region of the SCM.

\* \* \* \* \*